United States Patent
Kondo et al.

(10) Patent No.: US 8,667,738 B2
(45) Date of Patent: Mar. 11, 2014

(54) GLASS RUN CHANNEL ASSEMBLY AND ITS MANUFACTURING METHOD

(75) Inventors: Tomonori Kondo, Aichi (JP); Hiroyuki Ito, Aichi (JP); Tatsuya Tamura, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 413 days.

(21) Appl. No.: 12/699,414

(22) Filed: Feb. 3, 2010

(65) Prior Publication Data
US 2010/0199568 A1    Aug. 12, 2010

(30) Foreign Application Priority Data
Feb. 6, 2009   (JP) .................... 2009-026257

(51) Int. Cl.
  *E06B 7/16*   (2006.01)
(52) U.S. Cl.
  USPC .......... 49/479.1; 49/483.1; 49/492.1; 49/440; 49/441
(58) Field of Classification Search
  USPC ......... 49/440, 441, 479.1, 483.1, 49.1, 492.1, 49/502
  See application file for complete search history.

(56) References Cited

U.S. PATENT DOCUMENTS

| | | | | |
|---|---|---|---|---|
| 4,864,774 | A * | 9/1989 | Onishi et al. | 49/440 |
| 4,908,989 | A * | 3/1990 | Omura et al. | 49/441 |
| 5,655,333 | A * | 8/1997 | Yamashita | 49/441 |
| 6,708,450 | B2 * | 3/2004 | Tanaka et al. | 49/441 |
| 7,294,386 | B2 * | 11/2007 | Murase et al. | 428/99 |
| 7,410,203 | B2 * | 8/2008 | Yatsuda et al. | 296/146.2 |
| 7,533,495 | B2 * | 5/2009 | Teramoto et al. | 49/441 |
| 2002/0026751 | A1 * | 3/2002 | Kawai et al. | 49/479.1 |
| 2005/0053761 | A1 * | 3/2005 | Murase et al. | 428/122 |
| 2006/0107601 | A1 * | 5/2006 | Inagaki et al. | 49/441 |
| 2007/0175102 | A1 * | 8/2007 | Teramoto et al. | 49/441 |

FOREIGN PATENT DOCUMENTS

| | | |
|---|---|---|
| JP | U-63-173862 | 11/1988 |
| JP | 4331628 | * 11/1992 |
| JP | A-4-331628 | 11/1992 |
| JP | A-8-216694 | 8/1996 |
| JP | A-9-39579 | 2/1997 |
| JP | A-2000-103242 | 4/2000 |
| JP | A-2000-158950 | 6/2000 |
| JP | A-2002-225569 | 8/2002 |
| JP | A-2002-337550 | 11/2002 |
| JP | A-2003-118372 | 4/2003 |
| JP | A-2007-196909 | 8/2007 |

* cited by examiner

*Primary Examiner* — Katherine Mitchell
*Assistant Examiner* — Marcus Menezes
(74) *Attorney, Agent, or Firm* — Oliff PLC

(57) ABSTRACT

A glass run channel assembly which is made of an elastic polymeric material and which is capable of being mounted to a vehicle, including: a first long glass run channel, a second long glass run channel and a connecting glass run channel which connects the first and second glass run channels, the connecting glass run channel comprising a base bottom portion. The base bottom portion is provided with a projection portion which projects from an outer circumferential side surface of the base bottom portion. The projection portion includes at least a portion of a reinforcing member. The reinforcing member is molded in advance from a material which is harder and more rigid than the elastic polymeric material of the connecting glass run channel, and the reinforcing member includes a base portion arranged at the base bottom portion and a trunk portion which projects towards an outer circumferential side.

20 Claims, 13 Drawing Sheets

FRONT OF VEHICLE ← → REAR OF VEHICLE

GLASS RUN CHANNEL ASSEMBLY AND ITS MANUFACTURING METHOD

BACKGROUND OF THE INVENTION

1. Field of the Invention

The present invention relates to a glass run channel assembly mounted in a window frame of a vehicle.

2. Description of the Related Art

Generally, a window frame provided in a vehicle, such as a car, particularly, a window frame (referred to as a door frame in this case) provided in a main portion of a door panel of a slide door, a front door, a rear door, or the like, is mounted with a glass run channel assembly (referred to as a glass run, a glass run channel, a guide member, etc.). The glass run channel assembly for this application is a groove forming member (long molding member) which is molded long and which has a substantially U-shaped cross-section, and is mounted to a groove formed in a window frame, thereby guiding lifting/lowering of a window pane made of glass which moves up and down inside a member (for example, a door panel) which constitutes a vehicle. Generally, the glass run channel assembly is manufactured by performing extrusion molding or the like by using an elastic polymeric material, such as rubber or thermoplastic elastomer.

This kind of glass run channel assembly corresponds to the shape of the window frame, and includes a plurality of glass run channels which is molded in a long shape by extrusion molding, and a connecting glass run channel arranged at a corner portion of the window frame as a molded article which connects at least two long glass run channels. Generally this connecting glass run channel is molded by injection molding.

In this kind of glass run channel assembly, there is a possibility that displacement may be caused from a predetermined mounted position by the stress which acts when a glass window pane moves up and down, and a device for preventing the displacement is required. As one of the means which prevents such displacement, it is known that a protrusion for preventing movement is integrally provided at the corner portion (i.e., the above connecting glass run channel) of the window frame. By bringing this protrusion into contact with a portion of the window frame component member, it is possible to regulate the movement (displacement) of the glass run channel assembly accompanying the lifting/lowering of the window pane.

Meanwhile, it is conventionally suggested that the protrusion is formed from a harder material than a material which constitutes the main body of the connecting glass run channel so that the protrusion can maintain desired functions without being softened even when a glass run channel assembly for a vehicle is used under the condition of a high temperature. If even a slight gap exists between the hard protrusion and a mounted member (for example, door frame component member) in a case where the protrusion is provided using a hard material, when the hard protrusion strikes the mounted member during the lifting/lowering of the window pane, a noise may be generated due to the striking. In order to prevent this, Patent Document 1 discloses a glass run channel assembly and its manufacturing method characterized in that, an insert member made of a harder material than a die-molded portion is arranged in a portion (die-molded portion) corresponding to a corner portion of a glass opening in a glass run channel assembly, and the surface of the portion of the insert member corresponding to the protrusion is coated with a material (i.e., a relatively soft material) which constitutes the die-molded portion. Although it is unclear what sort of meaning the above "die-molded portion" has, this point will not be mentioned in this application.

[Patent Document 1] JP-A-2007-196909

However, the following problems are conceivable in the technique described in the above Patent Document 1.

(1) That is, in the above technique, it is necessary to arrange the above insert member which constitutes the protrusion within the molding die, and inject a molten material which constitutes the die-molded portion into the molding die, thereby molding the die-molded portion integrated with the insert member. For this reason, it is necessary to fix a hard insert member within a molding die to be used, and therefore, the structure of the molding die to be used becomes complicated. Additionally, since the insert member exists within a cavity, the flow of molten resin is obstructed, or the heat of the molten resin is lost. Thereby, the short shot in which the molten resin is not sufficiently spread to the cavity may be caused.

(2) Additionally, with the problem of the above (1), there is a possibility that an unrestorable defective article may be formed in a case where the insert member has not been correctly arranged in a predetermined regular position within the molding die with complicated structure, in a case where the insert member itself has not been inserted into the die, or in a case where the insert member has been displaced due to the pressure of the injected resin. Additionally, in a case where the molding die is closed in a state where the insert member has not been correctly arranged in a predetermined regular position, there is also a possibility that the molding die may be damaged.

Moreover, there is a great constraint in practical use that a high heat-resistant material which does not deteriorate in a molding process when the die-molded portion is injection-molded should be used as a material for the insert member.

Thus, the invention has been invented in order to solve the above problems (1) and (2), and the object thereof is to provide a glass run channel assembly of a configuration capable of exactly providing a protrusion serving as the above displacement suppression means in a predetermined position of the glass run channel assembly. Additionally, another object of the invention is to provide a method of stably manufacturing a glass run channel assembly having the above protrusion by a simple manufacturing apparatus. Additionally, still another object of the invention is to provide a window frame structure (for example, a door frame) of a vehicle in which such a glass run channel assembly is mounted in a predetermined position.

SUMMARY OF THE INVENTION

According to an aspect of the invention, there is provided a glass run channel assembly which is made of an elastic polymeric material and which is capable of being mounted along an inside of a groove of a door frame of a vehicle, comprising: a first long glass run channel which is extrusion-molded; a second long glass run channel which is extrusion-molded; and a connecting glass run channel which is injection-molded and which connects longitudinal terminals of the first and second glass run channels, wherein the glass run channel assembly being configured to guide a window pane which moves up and down within a door when mounted to the inside of the groove, wherein the first and second glass run channels, and the connecting glass run channel, comprise: a base bottom portion arranged at a position which faces a end face of the window pane; a side wall portion which projects integrally toward an inner circumferential side from the base bottom portion with a predetermined intersection angle with respect to the base bottom portion from at least an interior end of the base bottom portion in its width direction; and a seal lip which projects toward the base bottom portion in a folded-back shape from a protruding tip of the side wall portion, wherein the base bottom portion of the connecting glass run channel is provided with a projection portion which projects from an outer circumferential side surface of the base bottom portion, and the projection portion is enabled to engage with an engaging portion of a window frame component member provided within the groove of the window frame when the connecting glass run channel is mounted in a predetermined position of the window frame, wherein the projection portion includes at least a portion of a reinforcing member, wherein the reinforcing member is molded in advance from a material which is harder and more rigid than the elastic polymeric material of the connecting glass run channel, and the reinforcing member includes a base portion arranged at the base bottom portion and a trunk portion which projects toward an outer circumferential side from the base portion, wherein a base support portion which supports the base portion of the reinforcing member is formed on either an inner circumferential side surface or the outer circumferential side surface of the base bottom portion of the connecting glass run channel, wherein at least one of the following (1) and (2) is formed on the base bottom portion within a range corresponding to the projection portion:

(1) an insertion hole which passes through the base bottom portion in inner and outer circumferential directions; and (2) a protrusion portion which projects toward the outer circumferential direction from the outer circumferential side surface of the base bottom portion, and wherein the base portion is supported by the base support portion of the base bottom portion, and the trunk portion is fixed to a portion of the base bottom portion when the reinforcing member has been arranged at the base bottom portion of the connecting glass run channel.

According to another aspect of the invention, there is provided a manufacturing method of a glass run channel assembly which is made of an elastic polymeric material and which is capable of being mounted along an inside of a groove of a door frame of a vehicle, the glass run channel assembly comprising: a first long glass run channel which is extrusion-molded; a second long glass run channel which is extrusion-molded; and a connecting glass run channel which is injection-molded and which connects longitudinal terminals of the first and second glass run channels, wherein the glass run channel assembly being configured to guide a window pane which moves up and down within a door when mounted to the inside of the groove, wherein the first and second glass run channels, and the connecting glass run channel, comprise: a base bottom portion arranged at a position which faces an end face of the window pane; a side wall portion which projects integrally toward an inner circumferential side from the base bottom portion with a predetermined intersection angle with respect to the base bottom portion from at least an interior end of the base bottom portion in its width direction; and a seal lip which projects toward the base bottom portion in a folded-back shape from a protruding tip of the side wall portion, wherein the base bottom portion of the connecting glass run channel is provided with a projection portion which projects from an outer circumferential side surface of the base bottom portion, and the projection portion is enabled to engage with an engaging portion of a window frame component member provided within the groove of the window frame when the connecting glass run channel is mounted in a predetermined position of the window frame, wherein the projection portion includes at least a portion of a reinforcing member, wherein the reinforcing member is molded in advance from a material which is harder and more rigid than the elastic polymeric material of the connecting glass run channel, and the reinforcing member includes a base portion arranged at the base bottom portion and a trunk portion which projects toward an outer circumferential side of the base portion, wherein a base support portion which supports the base portion of the reinforcing member is formed on either an inner circumferential side surface or the outer circumferential side surface of the base bottom portion of the connecting glass run channel, the manufacturing method comprising steps of following (a)~(d):

(a) placing the terminals of the first glass run channel and the second glass run channel which are cut with predetermined lengths, respectively, inside a molding die at a predetermined distance from each other when the openable/closable molding die for forming the connecting glass run channel is open, (b) closing the molding die, and forming within the molding die a molding cavity for molding the connecting glass run channel, a portion of the molding cavity being defined by end faces of both the terminals, (c) injecting a polymeric material into the cavity, and molding the connecting glass run channel so that both the terminals are connected together by the connecting glass run channel, and wherein, when the connecting glass run channel is molded, the base support portion is formed on the inner circumferential side surface or outer circumferential side surface of the base bottom portion of the connecting glass run channel, and at least one of the following (1) and (2) is formed integrally on the base bottom portion within a range corresponding to the projection portion:

(1) an insertion hole which passes through the base bottom portion in inner and outer circumferential directions; and (2) a protrusion portion which projects toward the outer circumferential direction from the outer circumferential side surface of the base bottom portion, and (d) arranging the reinforcing member which is molded in advance in the base bottom portion of the connecting glass run channel which is taken out by opening the molding die, wherein the reinforcing member is fixed to the base bottom portion so that the base portion of the reinforcing member is supported by the base support portion of the base bottom portion, and the trunk portion of the reinforcing member is fixed to a portion of the base bottom portion.

DETAILED DESCRIPTION OF EXEMPLARY DOCUMENTS

Preferred embodiments of the invention will be described below. In addition, matters (for example, general matters about manufacture of a glass run channel by extrusion molding or the like), other than matters particularly mentioned in this specification, which are required for carrying out the invention, can be understood as design matters for those skilled in the art based on the related art. The invention can be carried out on the basis of the matters disclosed in the specification and drawings, and the technical common sense in the field.

Figure 1:
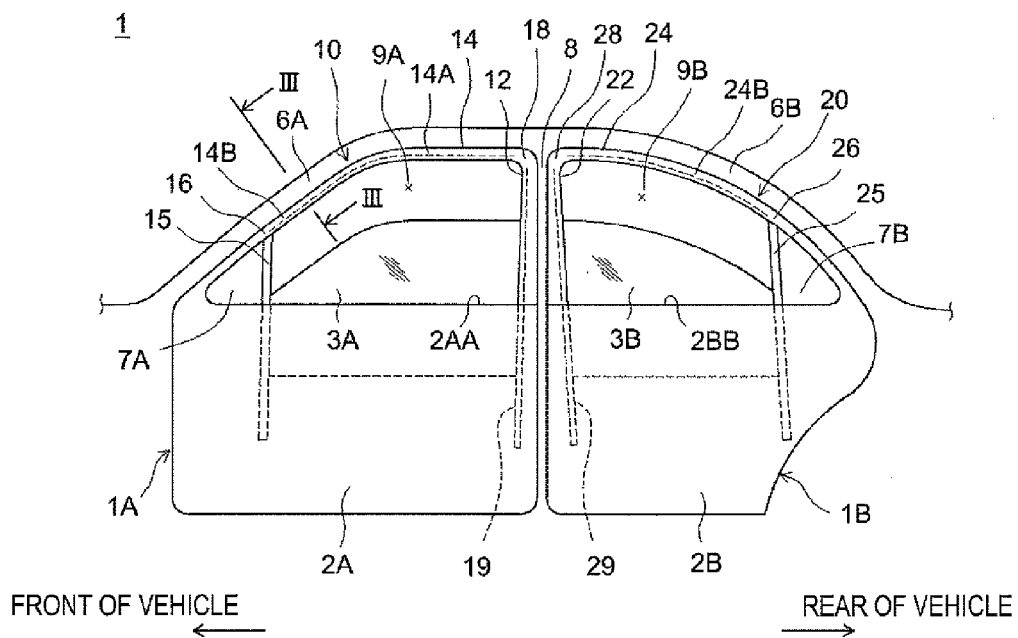
FIG. 1 is a exterior side view schematically showing a front door and a rear door to which glass run channel assemblies are mounted onto according to a first embodiment of the present invention.

Hereinafter, a preferred embodiment (first embodiment) of a glass run channel assembly of the invention will be described in detail with reference to the drawings. FIG. 1 is a side view schematically showing a front door 1A and a rear door 1B to be mounted to a car 1 (here, referred to as a sedan type passenger car). Although only the doors 1A and 1B to be mounted to the left side face of the car 1 are shown in this drawing, the door and glass run channel assembly of the same configuration (that is, bilaterally symmetrical) are also mounted to the right side face of the vehicle. For this reason, the following description is about only glass run channel assemblies and window frame structures to be mounted to left front and left rear doors 1A and 1B which are shown, and redundant description about glass run channel assemblies and window frame structure to be mounted to right door panels is omitted.

Additionally, in the invention, the front and the rear indicate the longitudinal direction of a vehicle, the inner circumferential side (or inner circumferential direction) and the outer circumferential side (or outer circumferential direction) indicate the central direction of a window opening, and the direction of an outer peripheral edge (direction away from the center of the window opening), respectively.

As shown in FIG. 1, the front door 1A according to this embodiment is generally comprised of a front door outer panel 2A and a front door inner panel (not shown in FIG. 1) (refer to reference numeral 4A in FIG. 4) which constitute a door body, and a front door frame 10 formed above the panel 2A and 4A. The front door outer panel 2A and the front door inner panel 4A according to this embodiment are formed by press working, and the front door frame (window frame) 10 is formed integrally with both the door panels.

The front door frame 10 has a longitudinal frame 12 which is arranged in a vertical direction along a center pillar 8 of the car 1, and an upper frame 14 formed integrally with an upper end of the longitudinal frame 12. The upper frame 14 has a horizontal frame portion 14A which extends in a substantially horizontal direction (i.e., a direction almost parallel to a direction in which an upper edge 2AA of the door panel 2A extends), and a slant frame portion 14B which extends obliquely downward along a front pillar 6A. Additionally, a partition frame 15 which extends in a vertical direction (that is, a direction substantially orthogonal to a direction in which an upper edge 2AA of the door panel 2A extends) as shown in the drawing is detachably mounted from the region of the slant frame portion 14B of the upper frame 14, the region of the slant frame portion 14B of the upper frame 14 being slightly nearer to the front. Although not particularly limited, in this embodiment, the partition frame 15 is fastened and fixed to the inner panel 4A which constitutes the slant frame portion 1413, by screws 46 or the like via a joint metal 45 having an L-shaped cross-section which will be described later.

Additionally, as shown in the drawing, a front corner portion 16 is formed so that the partition frame 15 and the slant frame portion 14B intersect each other at a predetermined intersection angle, and a rear corner portion 18 is formed so that the vertical frame 12 and the horizontal frame portion 14A intersect each other at a predetermined intersection angle.

Then, a glass run channel assembly 50 according to this embodiment is mounted within a groove continuously formed on the inner circumferential side of the front door frame 10 (that is, the vertical frame 12, the upper frame 14, and the partition frame 15), and constitutes the window frame structure. The character and state of the glass run channel assembly will be described below.

A triangular opening, which is surrounded by the door panel upper edge 2AA, the slant frame portion 14B, and the partition frame 15, is formed in front side of the partition frame 15, and a front quarter window glass (that is, fixed window) 7A is fitted into the opening.

A window opening 9A, which is surrounded by the door panel upper edge 2AA, the upper frame 14 (the horizontal frame portion 14A and the slant frame portion 14B), the vertical frame 12, and the partition frame 15, is formed at rear side of the partition frame 15. A window pane 3A, which is attached to a window pane lifting/lowering mechanism (not shown) provided within the door panel 2A, is mounted on the opening 9A so that the window pane can move up and down. During lifting/lowering of the window pane 3A, periphery of the window pane 3A is guided by the glass run channel assembly 50 which will be described later.

Similarly, the rear door 1B according to this embodiment is generally comprised of a rear door outer panel 2B and a rear door inner panel (not shown) which constitute a door body, and a rear door frame 20 which is a window frame formed above the panel 2B. The rear door outer panel 2B and the rear door inner panel according to this embodiment are formed by press working, and the rear door frame (window frame) 20 is formed integrally with both the door panels.

The rear door frame 20 has a vertical frame 22 which is arranged in a vertical direction along a center pillar 8 of the car 1, and an upper frame 24 formed integrally with an upper end of the vertical frame 22. The upper frame 24 is composed of a slant frame portion 24B which extends obliquely downward while being curved along a rear pillar 6B from the upper end of the vertical frame 22.

Additionally, a partition frame 25 which extends in a vertical direction (that is, a direction substantially orthogonal to a direction in which an upper edge 2BB of the door panel 2B extends) as shown in the drawing is detachably mounted from the region of the slant frame portion 24B of the upper frame 24, the region of the slant frame portion 24B of the upper frame 24 being slightly nearer to the rear.

Additionally, as shown in the drawing, a front corner portion 28 is formed so that the vertical frame 22 and the upper frame 24 (slant frame portion 24B) intersect each other at a predetermined intersection angle, and a rear corner portion 26 is formed so that the partition frame 25 and the upper frame 24 (slant frame portion 24B) intersect each other at a predetermined intersection angle. Although the whole upper frame 24 is curved to form the slant frame portion 2413 in the rear door frame, this upper frame may have a horizontal frame portion like the upper frame 14 of the front door frame.

Then, a glass run channel assembly 50A according to this embodiment similar to the front door frame 10 is mounted within a groove continuously formed on the inner circumferential side of the rear door frame 20 (that is, the vertical frame 22, the upper frame 24, the partition frame 25, and the front and rear corner portions 28 and 26).

A triangular opening, which is surrounded by the door panel upper edge 2BB, the slant frame portion 24B, and the partition frame 25, is formed at rear side of the partition frame 25, and a rear quarter window glass (that is, fixed window) 7B is fitted into the opening.

A window opening 9B, which is surrounded by the door panel upper edge 2BB, the upper frame 24 (slant frame portion 24B), the vertical frame 22, and the partition frame 25, is formed in front side of the partition frame 25. A window pane 3B, which is attached to a window pane lifting/lowering mechanism (not shown) provided within the door panel 2B, is mounted on the opening 9B. During lifting/lowering of the window pane 3B, the periphery of the window pane 3B is guided by the glass run channel assembly 50A which will be described later.

Figure 2:
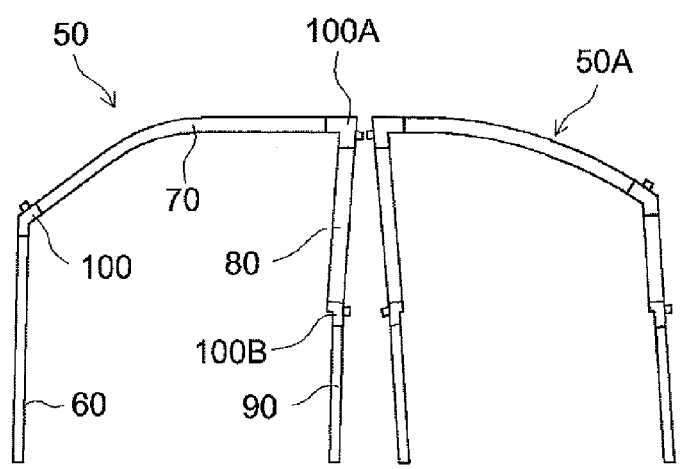
FIG. 2 is a side view schematically showing the whole glass run channel assemblies according to a first embodiment of the present invention.

FIG. 2 is a side view schematically showing the whole glass run channel assemblies 50 and 50A according to this embodiment, which are respectively mounted within the grooves of the front door frame 10 and the rear door frame 20, which are described above. As shown in this drawing, there is a slight difference in size or the like depending on a difference in the shape of the door frames 10 and 20. However, the glass run channel assembly 50 for the front door frame 10 and the glass run channel assembly 50A for the rear door frame 20 are almost the same in their general configuration, and there is no difference in the configuration which characterizes the invention. Accordingly, the following description will be given about the glass run channel assembly 50 for the front door frame 10, and since the description about the glass run channel assembly 50A for the rear door frame 20 is redundant, it is omitted.

As shown in FIG. 2, the glass run channel assembly 50 according to this embodiment includes a first long glass run channel 60 mounted along the partition frame 15, a second long glass run channel 70 mounted along the upper frame 14, a third long glass run channel 80 mounted along the vertical frame 12, and a fourth long glass run channel 90 mounted along a lower sash 19 (the rear door outer panel 2B is also equipped with a similar lower sash 29) which is equipped in the front door outer panel 2A and is separate from the panel 2A.

Moreover, the glass run channel assembly 50 according to this embodiment includes a total of three connecting glass run channels 100, 100A and 100B in addition to the first to fourth long glass run channels 60, 70, 80, and 90. That is, the glass run channel assembly 50 includes the connecting glass run channel 100 which integrally connects the longitudinal terminals of the first and second glass run channels 60 and 70 together, the connecting glass run channel 100A which integrally connects the longitudinal terminals of the second and third glass run channels 70 and 80 together, and the connecting glass run channel 100B which connects the longitudinal terminals of the third and fourth glass run channels 80 and 90 together.

The above first to fourth long glass run channels 60, 70, 80, and 90 are respectively formed in a predetermined constant cross-sectional shape from a predetermined elastic polymeric material by extrusion molding. Preferable elastic polymeric materials include elastic rubber (typically, a material consisting mainly of ethylene propylene diene rubber (EPDM rubber)), an olefin-based thermoplastic elastomer (TPO), etc. The elastic rubber is, for example, a rubber material for extrusion molding obtained by blending EPDM (here, 100 parts by mass), carbon black (here, 120 parts by mass), process oil (here, 80 parts by mass), various kinds of vulcanizing agents (here, 1 part by mass of sulfur), various kinds of fillers (here, 30 parts by mass of talc), various kinds of vulcanization accelerators (here, 2 parts by mass), and the like. By extrusion-molding this rubber material in a predetermined constant cross-sectional shape to form an extrusion-molded product, and further performing heat treatment (for example, about 200° C.) to vulcanize the extrusion-molded product, glass run channels made of a vulcanized elastic rubber material are obtained. The "parts by mass" represents "parts by weight" or "pbr (parts per hundred parts of rubber)".

Meanwhile, the connecting glass run channels 100, 100A and 100B are formed so as to connect terminals of adjacent glass run channels together by performing injection molding (insert injection molding) using a predetermined elastic polymeric material between the terminals. Preferable elastic polymeric materials include elastic rubber (typically, a material consisting mainly of EPDM rubber), TPO, etc. When injection molding is performed between the terminals of adjacent glass run channels, it is preferable to use elastic polymeric materials having compatibility with an elastic polymeric material which form the adjacent glass run channels and capable of being chemically joined so as to be suitably connected with the terminals. Especially in a case where polymeric materials which have insufficient compatibility or have no compatibility, it is preferable to perform the pretreatment of forming a suitable adhesive layer at the end faces of the glass run channels connected when injection molding is performed, or providing irregularities in the faces to be connected.

Figure 3:
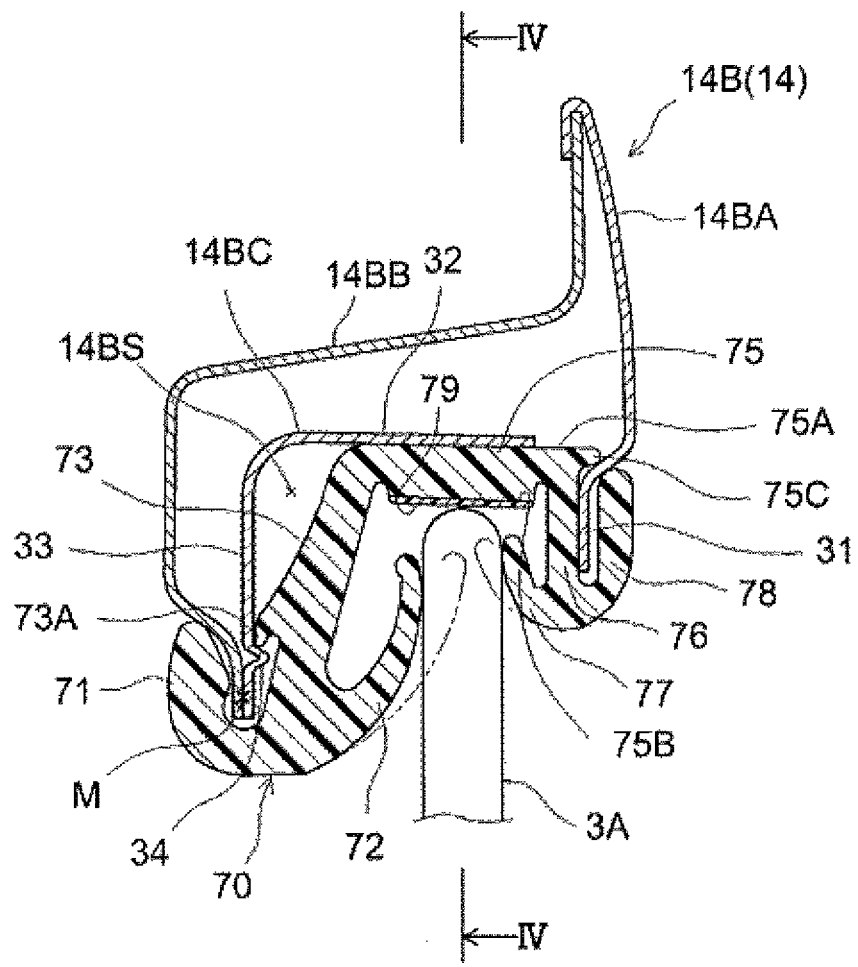
FIG. 3 is a cross-sectional view taken along the line in FIG. 1.

Next, the cross-sectional shape and attachment form of the first to fourth long glass run channels which constitute the glass run channel assembly 50 according to this embodiment will be briefly described. FIG. 3 is a cross-sectional view taken along the line in FIG. 1. On the basis of this drawing, the cross-section structure of the long second glass run channel 70 according to this embodiment will be described along with the configuration of a member which constitute a window frame (here, slant frame portion 14B) in the relevant part. Since the other first, third, fourth long glass run channels 60, 80, and 90 also have almost the same configuration, redundant description is omitted.

As shown in FIG. 3, the slant frame portion 14B (upper frame 14) is constituted so that an exterior door frame 14BA which is formed so as to extend upward of the vehicle from the door outer panel 2A, and an interior door frame 14BB which is formed so as to extend upward of the vehicle from a door outer panel (not shown) are bent in a predetermined form and thereby engaged with each other. As shown in the drawing, a stopper 14BC having an L-shaped cross-section other than the exterior door frame 14BA and the interior door frame 14BB is mounted as a window frame component member. Specifically, overlapping parts (parts designated by reference numeral M in the drawing) between the interior door frame 14BB and the stopper 14BC are joined together by spot welding, etc.

A groove 14BS, which is surrounded by an exterior side wall 31 composed of the exterior door frame 14BA, and an interior side wall 33 and a bottom wall 32 composed of the stopper 14BC, is formed in the slant frame portion 14B having this configuration. In addition, a convex portion 34 is formed in a portion of the surface of the interior side wall 33 along a longitudinal direction on the side of the groove 14BS.

Meanwhile, as shown in FIG. 3, the long glass run channel (here, the second glass run channel 70) according to this embodiment has a substantially U-shaped constant cross-sectional shape in a state where the long glass run channel is mounted in the groove 14BS of the slant frame portion 14B. The glass run channel 70 generally has the base bottom portion 75 which is arranged at a position which faces the end face of the window pane 3A which is guided by the window frame 10 and moves up and down, and exterior side wall portion 76 and interior side wall portion 73 which projects from both ends in the width direction of the base bottom portion 75 and have a predetermined intersection angle with the base bottom portion 75 and which projects integrally towards an inner circumferential side from the base bottom portion 75. A low friction layer 79 whose stationary friction coefficient is lower than the base bottom portion 75 is continuously formed in the longitudinal direction on an inner circumferential surface 75B of the base bottom portion 75. This makes it possible to prevent the deviation of the glass run channel 70 when the window pane 3A which moves up and down strikes the base bottom portion 75 (low friction layer 79).

An exterior projection ridge portion 75C which projects further in the exterior direction than the exterior side wall portion 76 is integrally formed at the exterior end of the base bottom portion 75 in the width direction. An interior retaining projection ridge portion 73A is formed at a portion of the interior side wall portion 73 so as to project towards the inner circumferential side. In a state where the glass run channel 70 is mounted in the groove 14BS of the slant frame portion 14B, the interior retaining projection ridge portion 73A is engaged with the convex portion 34, and the exterior projection ridge portion 75C is engaged with a portion of the exterior side wall 31 of the exterior door frame 14BA (typically, a portion where a step is caused by being bent as shown in the drawing.) This prevents slip-off of the glass run channel 70 from the groove 14BS.

Figure 4:
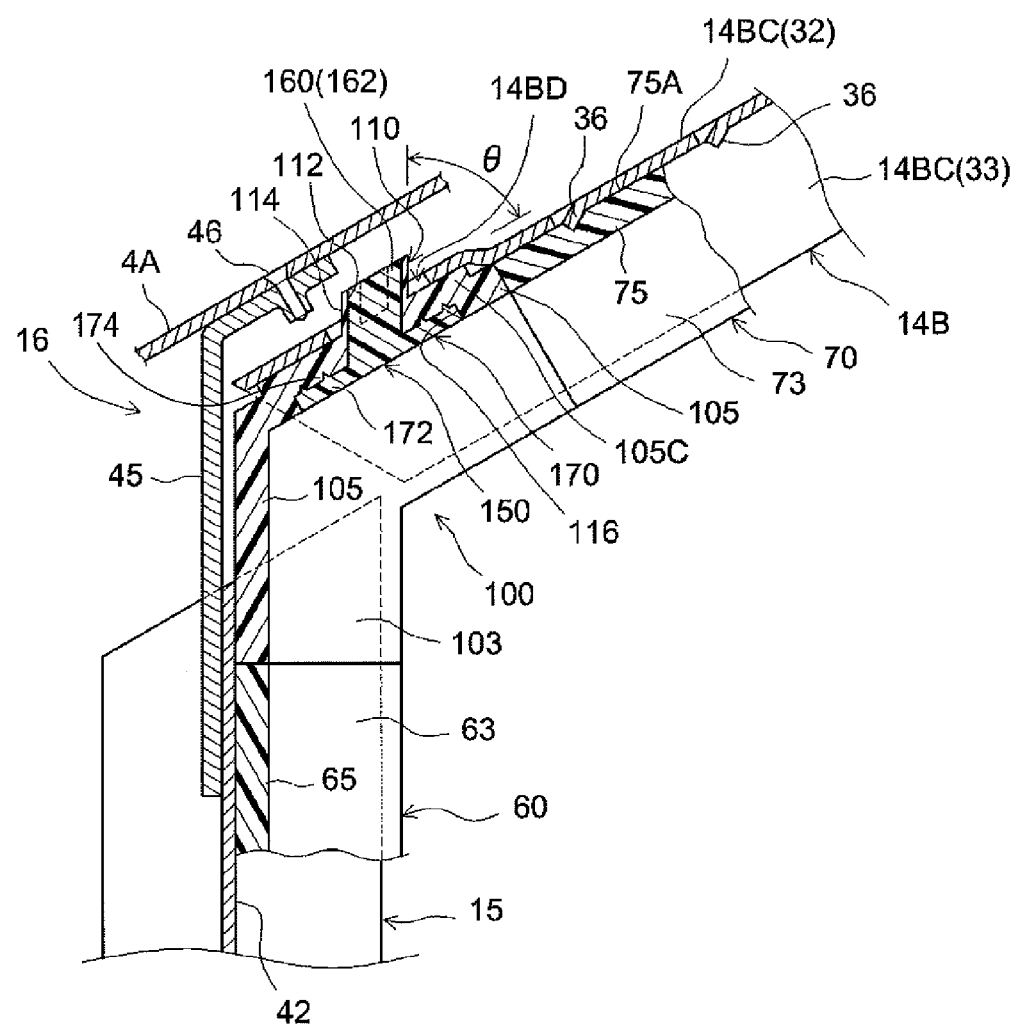
FIG. 4 is a longitudinal sectional view taken along the line IV-IV in FIG. 3.

Moreover, as shown in FIG. 4 which will be described later, sticking projections 36 which project inward of the groove 14BS are formed in some places of the bottom wall 32 of the stopper 14BC. When the glass run channel 70 is mounted into the groove 14BS, the sticking projections 36 sticks into an outer circumferential side surface 75A of the base bottom portion 75, the deviation of the glass run channel 70 in the longitudinal direction is prevented.

As shown in the drawing, the interior side wall portion 73 and the exterior side wall portion 76 have seal lips (i.e., an interior seal lip 72 and an exterior seal lip 77) which project toward the base bottom portion 75 in a folded-back manner from their respective protruding tips.

Moreover, concealing lips (i.e., an interior concealing lip 71 and an exterior concealing lip 78) are respectively and integrally formed at protruding tips of the interior side wall portion 73 and the exterior side wall portion 76. These concealing lips extend toward the side opposite to the seal lips 72 and 77 in a folded-back manner while holding a space with the side wall portions, and is able to elastically deform and conceal the edge portions of the interior side wall 33 and exterior side wall 31 of the door frame 10 (slant frame portion 14B) when being mounted on the door frame 10 (slant frame portion 14B). Since the structure of the second glass run channel 70 (and other first, third, and fourth long glass run channels 60, 80, and 90) described above is not a substantial portion of the invention, the description of the further detailed structure is omitted.

Next, the connecting glass run channel 100 which characterizes the glass run channel assembly 50 (the same is true in the glass run channel assembly 50A mounted on the rear door frame 20) according to this embodiment will be described in detail. Although the glass run channel assembly 50 according to this embodiment includes a total of three connecting glass run channels 100, 100A and 100B, since the characteristic portion of the invention in the three glass run channels are common, the connecting glass run channel 100 which integrally connects the longitudinal terminals of the first and second glass run channels 60 and 70 will be described below with reference to the drawings. Since the interior side wall portion, exterior side wall portion, and accessory portions (the concealing lips 71 and 78, the seal lips 72 and 77, etc.) formed in them, in the cross-sectional shapes of the first long glass run channel 60 and the connecting glass run channel 100 according to the first embodiment, have substantially the same shapes as those formed in the above-described second long glass run channel 70 shown in FIG. 3, further detailed description is omitted.

FIG. 4 is a view showing the configuration of the front corner portion 16 where the partition frame 15 and the slant frame portion 14B intersect each other at a predetermined intersection angle, and is shown in a longitudinal section when the connecting glass run channel 100 according to the first embodiment arranged in the relevant portion is seen from the exterior side. In order to make the characteristic structure (i.e., the shape of the base bottom portion and a reinforcing member which will be described later) of the connecting glass run channel 100 according to the first embodiment easily understood in FIG. 4, illustration of the accessory portions, which are provided in the interior side wall portion and exterior side wall portion, such as the above-described seal lips and concealing lips essentially provided in the various glass run channels 60, 70, and 100 shown on the drawings are omitted.

First, the panel configuration in the relevant portion will be described. As shown in the drawing, the front corner portion 16 is composed of the end of the slant frame portion 14B having the above-described configuration, and the partition frame 15 which intersects the slant frame portion 14B at a predetermined intersection angle. The partition frame 15 is made of a steel material formed to have a substantially H-shaped cross-section, and the portion 42 which extends in the vehicle width direction of the partition frame 15 (metallic sheet molded articles having an H-shaped cross-section) constitutes the bottom wall portion 42 of the partition frame 15. Additionally, the partition frame 15 is fixed to a joint metal 45 having an L-shaped cross-section by spot welding, etc., and the joint metal 45 is fastened and fixed to the front door inner panel 4A by a screw 46, etc. This makes it possible to fix the partition frame 15 in a predetermined position.

Meanwhile, as shown in FIG. 4, the connecting glass run channel 100 which has a cross-sectional shape which can correspond to the long glass run channels 60 and 70 is mounted between the terminal of the first long glass run channel 60 mounted in the groove (not shown) of the partition frame 15, and the terminal of the second long glass run channel 70 mounted in the groove 14BS (refer to FIG. 3) of the slant frame portion 14B. Specifically, the connecting glass run channel 100 according to this embodiment has exterior side wall portions (not shown), a base bottom portion 105, and an interior side wall portion 103 connected respectively to exterior side wall portions (not shown in FIG. 4), the base bottom portions 65 and 75, and the interior side wall portions 63 and 73 of both the first and second glass run channels 60 and 70 which are adjacent to each other.

The base bottom portion 105 of the connecting glass channel assembly 100 according to this embodiment is formed with a thicker wall portion 105C than adjacent portions. This thicker wall portion 105C is formed with a projection portion 110 of this embodiment.

That is, as shown in FIG. 4, the projection portion 110 which projects from the outer circumferential side surface of the base bottom portion 105 is provided substantially at the center of the thicker wall portion 105C. Specifically, the projection portion 110 in this embodiment includes an insertion hole 112 that is a through hole passed through the base bottom portion 105 (thicker wall portion 105C) in its inner and outer circumferential directions, a protrusion portion 114 which has a cavity inside and projects from the outer circumferential side surface of the base bottom portion 105 and is formed from the same elastic polymeric material as the base bottom portion 105 to constitute a surrounding wall of the insertion hole 112, and a trunk portion 160 of a reinforcing member 150 which will be described later. Moreover, a contacting recess 116 which corresponds to a base support portion which supports a base portion 170 of the reinforcing member 150 which will be described later is formed around the insertion hole 112 on the inner circumferential side of the base bottom portion 105 (thicker wall portion 105C). Specifically, the recess 116 is formed so as to have a step recessed towards the outer circumferential side in a position which comes into contact with at least a portion of the periphery of the base portion 170 of the reinforcing member 150. This recess 116 is formed within a wider range than the base portion 170 with a shape corresponding to the outer shape of the base portion 170 of the reinforcing member 150. As shown in the drawing, the insertion hole 112 is formed along an axial direction in which the protrusion portion 114 projects from the base bottom portion 105.

Meanwhile, an engagement hole 14BD of such a size that the above the protrusion portion 114 can pass therethrough is formed in the position of the stopper 14BC to which the projection portion 110 corresponds to, the stopper being window frame component member. This makes it possible to mount the connecting glass run assembly 100 in a predetermined position without being hindered by the protrusion portion 114 and the trunk portion 160 of the reinforcing member 150 which will be described later, as shown in the drawing.

By this configuration, in a case where the connecting glass run channel 100 has moved (displaced) along the slant frame portion 14B in the longitudinal direction (a direction in which the horizontal frame portion 14A exists), an external wall surface of the projection portion 110, i.e., in this embodiment, an external wall surface of the protrusion portion 114 whose mechanical strength is reinforced by the trunk portion 160 of the reinforcing member 150 (which will be described later) fixed into the insertion hole 112 comes into contact with the circumferential edge of the engagement hole 14BD. By this contact, the movement of the connecting glass run channel 100 is restricted, and any displacement can be prevented. In this embodiment, the engagement hole 14BD as described above is formed in the stopper 14BC that is a window frame component member in order to engage the projection portion 110. However, instead of such an opening shape (hole shape), a longitudinal end (edge portion) of the stopper 14BC may be used as an engaging portion, and the external wall surface of the projection portion 110 may strike the end (edge portion) when the connecting glass run channel 70 has moved in the longitudinal direction (direction in which the horizontal frame portion 14A exists).

Additionally, by this configuration, the insertion hole passes through the base bottom portion 105. Therefore, the existence and attachment state of the reinforcing member can be confirmed from the outer circumferential side of the connecting glass run channel. This makes it possible to mount the glass run channel assembly in a predetermined position more exactly.

Additionally, as the base portion of the reinforcing member comes into contact with the step (contacting recess) which recess towards the outer circumferential side, the positioning of the reinforcing member becomes easy. For this reason, the reinforcing member can be easily arranged and fixed in an exact position.

Additionally, although the intersection angle $\theta$ between the projecting direction of the protrusion portion 114 and the stopper 14BC may be perpendicular, as shown in the drawing, it is preferable that the projecting direction of the protrusion portion 114 is determined (i.e., the formation direction of the insertion hole 112 is determined) so that the intersection angle $\theta$ becomes an acute angle. By setting the intersection angle $\theta$ to an acute angle, the connecting glass run channel 100 can be more effectively prevented from slipping out of the stopper 14BC during use.

Figure 5:
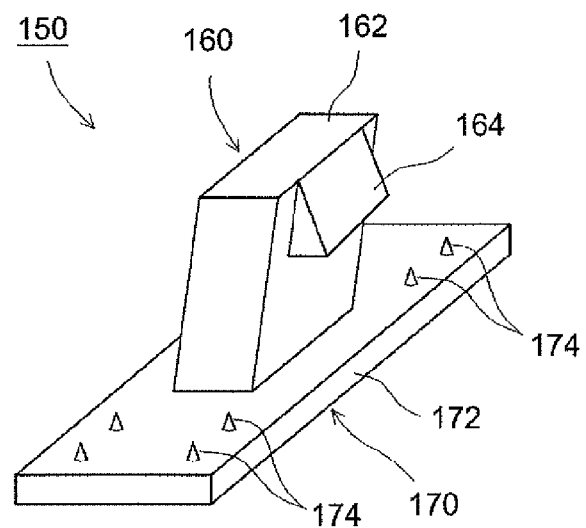
FIG. 5 is a perspective view schematically showing the configuration of a reinforcing member according to the first embodiment of the present invention.

Next, the reinforcing member 150 according to this embodiment equipped in the projection portion 110 will be described with reference to the drawings. FIG. 5 is a perspective view schematically showing the configuration of the reinforcing member 150 according to this embodiment.

The reinforcing member 150 according to this embodiment is a synthetic resin material which is harder and more rigid than the polymeric material of the connecting glass run channels, which is formed in advance from polymeric materials, for example, such as polyacetal (POM) and nylon (polyamide-based resin) and a separate member (or may be a press-formed article made of metallic material, a cast, a forged article, etc.), and as shown in FIG. 5, has a flat board base portion 170 and a trunk portion 160 which projects in a direction away from the base portion 170.

A flat board main portion 172 of the base portion 170 is molded with a size and shape such that the main portion is fitted into the above recess (base support portion) 116, and has a plurality of displacement suppression protrusions 174 formed on the surface which faces the base bottom portion 105. Meanwhile, the trunk portion 160 is composed of a main portion 162 with such a size (a rectangular parallelepiped shape in this embodiment) that the trunk portion is inserted into the above insertion hole 112, and a pair of engagement projections 164 formed so as to project further than two wide side faces (only one is shown in the drawing) of the rectangular-parallelepiped-shaped main portion 162, and the dimensions between the pair of engagement projections 164 and 164 are set to be greater than the inner dimensions of the insertion hole 112. It is preferable from the viewpoint of prevention of slip-off that the outer shape (i.e., size and thickness) of the main portion 162 of the trunk portion 160 is formed to be the same as the inner shape of the above insertion hole 112 or to be greater than the insertion hole 112 within an expandable range caused by the elastic deformation of the insertion hole 112. In the case of this embodiment, the outer shape of the main portion 162 of the trunk portion's 160 is molded to be slightly larger than the inner shape (i.e., size and shape of the hole) of the insertion hole 112 (the same is true in other embodiments which will be described later).

As shown in FIG. 4, the reinforcing member 150 having this configuration is mounted in a predetermined position of the projection portion 110 by inserting the trunk portion 160 into the insertion hole 112 simultaneously when the base portion 170 is fitted into the recess (base support portion) 116. In this case, the displacement of the reinforcing member 150 can be prevented as the displacement suppression protrusions 174 of the base portion 170 bump against and stick into the recess 116 (preferably sticks such that a portion of the base bottom portion 105 is deformed). By the frictional force caused as the trunk portion 160 (the main portion 162 and the engagement projections 164) inserted into the insertion hole 112 are brought into press-contact with the inner wall surface (the inner wall surfaces of both the main portion of the base bottom portion 105 and the protrusion portion 114 in this embodiment) of the insertion hole 112, and as the engagement projections 164 elastically deform and stick into the inner wall surface of the insertion hole 112, as shown in FIG. 4, the reinforcing member 150 is fixed in the mounting position. Additionally, although the reinforcing member 150 according to this embodiment is provided with the engagement projections 164 arranged in the trunk portion 160, a trunk portion with no such projections may be provided. In that case, by providing a trunk portion having a larger outer shape than the inner shape of the insertion hole 112, the reinforcing member 150 can be fixed in a predetermined position by large frictional force caused by the press-contact between the inner wall surface of the insertion hole 112 and the trunk portion.

In the form shown in FIG. 4, the reinforcing member 150 is fixed to the base bottom portion 105 in a state where the trunk portion 160 has been situated in the insertion hole 112 (i.e., the inside of the protrusion portion 114). However, the reinforcing member 150 is not limited to this form. For example, the portion of the trunk portion 160 closer to its tip may be thrust through the insertion hole 112.

For example, in a case where the above-mentioned protrusion portion 114 does not exist, the opening of the insertion hole 112 is formed in the outer circumferential side surface of the flat base bottom portion 105. In that case, however, the engagement projections 164 arranged in the trunk portion 160 are thrust through the insertion hole 112 while elastically deforming the surrounding wall thereof, and the thrust engagement projections 164 are engaged with the peripheral edge of the opening of the insertion hole which has returned from the elastic deformation at the outer circumferential side of the base bottom portion 105, so that the reinforcing member 150 can be firmly fixed to the base bottom portion 105.

Alternatively, in a case where the protrusion portion exists, the protrusion portion 114 may be provided with a cutout so that only the engagement projections 164 are exposed instead of thrusting the whole portion near the tip of the trunk portion 160 through the insertion hole 112. In such a case, the reinforcing member 150 can be firmly fixed to the base bottom portion 105 as the engagement projections 164 pass through the insertion hole 112 while elastically deforming the protrusion portion 114, and are engaged with the circumferential edge of a cutout portion formed in the protrusion portion 114.

Additionally, the engagement projections 164 may be formed in an elastic deformable shape. In this case, since both the protrusion portion 114 and the engagement projections 164 can be deformed, the resistance when being inserted into the insertion hole 112 can be reduced, and since an operator can recognize that the engagement projections 164 has been engaged with the peripheral edge of the insertion hole 112 with a feeling of response (so-called click feeling), insertion operation becomes easy.

In the connecting glass run channel 100 according to this embodiment having a configuration in which such a reinforcing member 150 is mounted on the projection portion 110, a separate member molded in advance as a hard reinforcing member 150 is used. Thereby, unlike the configuration in which the projection portion is integrally molded by an injection molding method within a molding die into which an insert member is inserted as in the above-described conventional example, the projection portion 110 which has excellent mechanical strength can be formed by virtue of the easy operation of mounting the reinforcing member 150 in a predetermined position of the connecting glass run channel. Additionally, since the operation of placing the reinforcing member in an exact position within the molding die is unnecessary, an excessive attentiveness for the operation is not imposed on an operator. Also, since the reinforcing member 150 may be attached to the base bottom portion 105 which constitutes the main portion of the connecting glass run channel 100 afterward, the constraints of the material and shape which constitute the reinforcing member 150 can also be reduced.

Figure 6A:
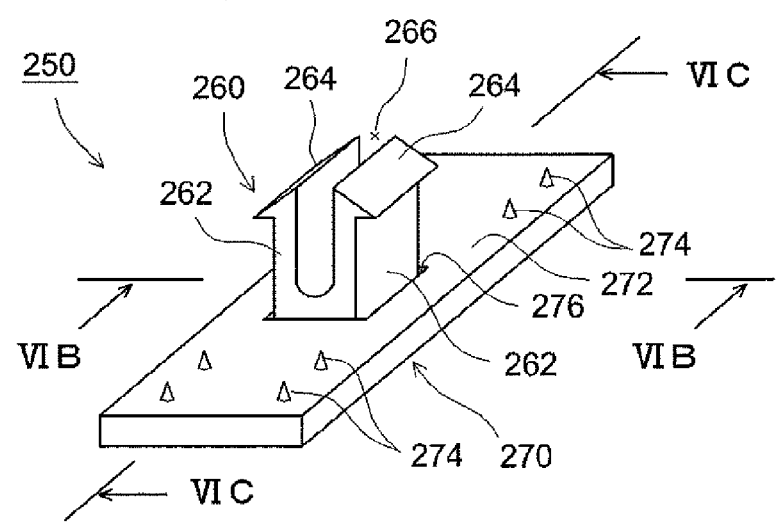
FIG. 6A is a perspective view schematically showing a modification to the configuration of the reinforcing member according to the first embodiment of this application.
Figure 6B:
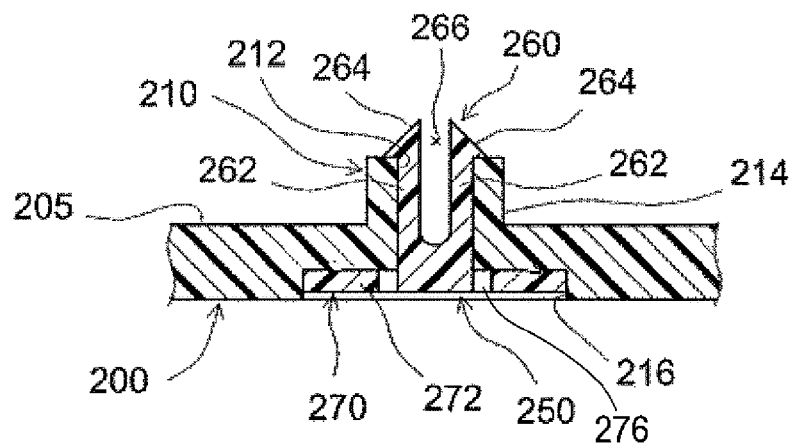
FIG. 6B is a cross-sectional view taken along the line VIB-VIB in FIG. 6A
Figure 6C:
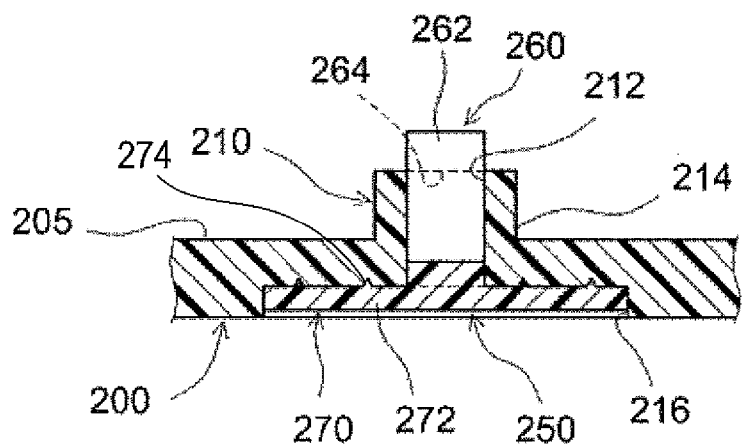
FIG. 6C is a longitudinal sectional view taken along the line VIC-VIC in FIG. 6A.

The shape of the reinforcing member 150 is not limited to that of the above-described embodiment. For example, modifications as will be described below are given. FIG. 6A is a perspective view schematically showing the shape of the reinforcing member 250 that is a first modification. Additionally, FIGS. 6B and 6C are respectively a sectional view taken along the line VIB-VIB in FIG. 6A and a sectional view taken along the line VIC-VIC, and are sectional views of a state where the reinforcing member is mounted on a base bottom portion 205 of a connecting glass run channel 200.

As shown in the drawing, this reinforcing member 250 includes a base portion 270 which has the same flat board main portion 272 and displacement suppression protrusions 274 as the reinforcing member 150 according to the above first embodiment. Meanwhile, a grooved space portion (deformation allowable portion) 266 is formed at the central portion of the trunk portion 260 which characterizes this modification, and a pair of main portions 262 are formed in a bifurcated shape with the space portion 266 therebetween. An engagement projection 264 which projects from the main portion 262 is formed at the tip of each main portion 262. As a result of having this configuration, the pair of main portions 262 which is formed in a bifurcated shape has flexibility, face each other across the space portion 266, and is able to deform in directions in which the main portions approach each other. Additionally, an end portion of the main portions 262 of the trunk portion 260 adjacent to the base portion 270 are respectively formed with slits 276 as shown in the drawing, and favorable flexibility is realized by the main portions 262.

In this case, it is preferable that an insertion hole 212 of the projection portion 210 (has the insertion hole 212, a protrusion portion 214 which has a cavity inside, and a recess 216 similarly to the above first embodiment) formed in the base bottom portion 205 of the connecting glass run channel 200 is formed so as to be slightly smaller than the outer shape of the whole trunk portion 260. Thereby, as shown in FIGS. 6B and 6C, when the trunk portion 260 is inserted into this insertion hole 212, the main portions 262 and 262 are inserted through the insertion hole 212 in directions (i.e., directions in which the width of the space portion 266 decreases) in which the main portions approach each other, and the main portions 262 and 262 which have been elastically deformed when all the engagement projections 264 have passed through the insertion hole 212 and have come out to the outer circumferential side of the base bottom portion 205 return to their original states, and the engagement projections 264 which have passed are engaged with the peripheral edge (here, the peripheral edge of the opening of the upper end of the protrusion portion 214) of the opening of the insertion hole 212 on the outer circumferential side of the base bottom portion 205. In this case, the main portions 262 and 262 are easily deformed by the space portion 266. Thereby, even if the engagement projections 264 which are engaged with the peripheral edge of the opening of the insertion hole 212 are formed more largely, the main portions can be deformed to such an extent that the main portions can be inserted through the insertion hole 212, and the reinforcing member 250 can be fixed in a predetermined position of the base bottom portion 205.

In the above-described first embodiment and its modification, the reinforcing member 150 or 250 is bilaterally symmetrically formed in the long side direction and short side direction of the flat board main portion 172 or 272. For this reason, it is not necessary to keep an eye on a direction when the reinforcing member 150 or 250 is fixed in a predetermined position, and mounting operation can be made easy so that an operator's burden can be alleviated.

In the above-described first embodiment and its modification, the reinforcing member 150 or 250 is mounted on the inner circumferential side of the base bottom portion 105 or 205 of the connecting glass run channel 100 or 200. However, the reinforcing member is not limited to such a form. For example, the reinforcing member is adapted so as to be mounted on the outer circumferential side of a base bottom portion of a connecting glass run channel.

A preferred example of a connecting glass run channel including a reinforcing member mounted on the outer circumferential side of the base bottom portion will be described as a second embodiment with reference to drawings. In addition, in the drawings which describe this embodiment, the same reference numerals are given to substantially the same members and mechanisms as those of the first embodiment, and redundant description is omitted.

Figure 7:
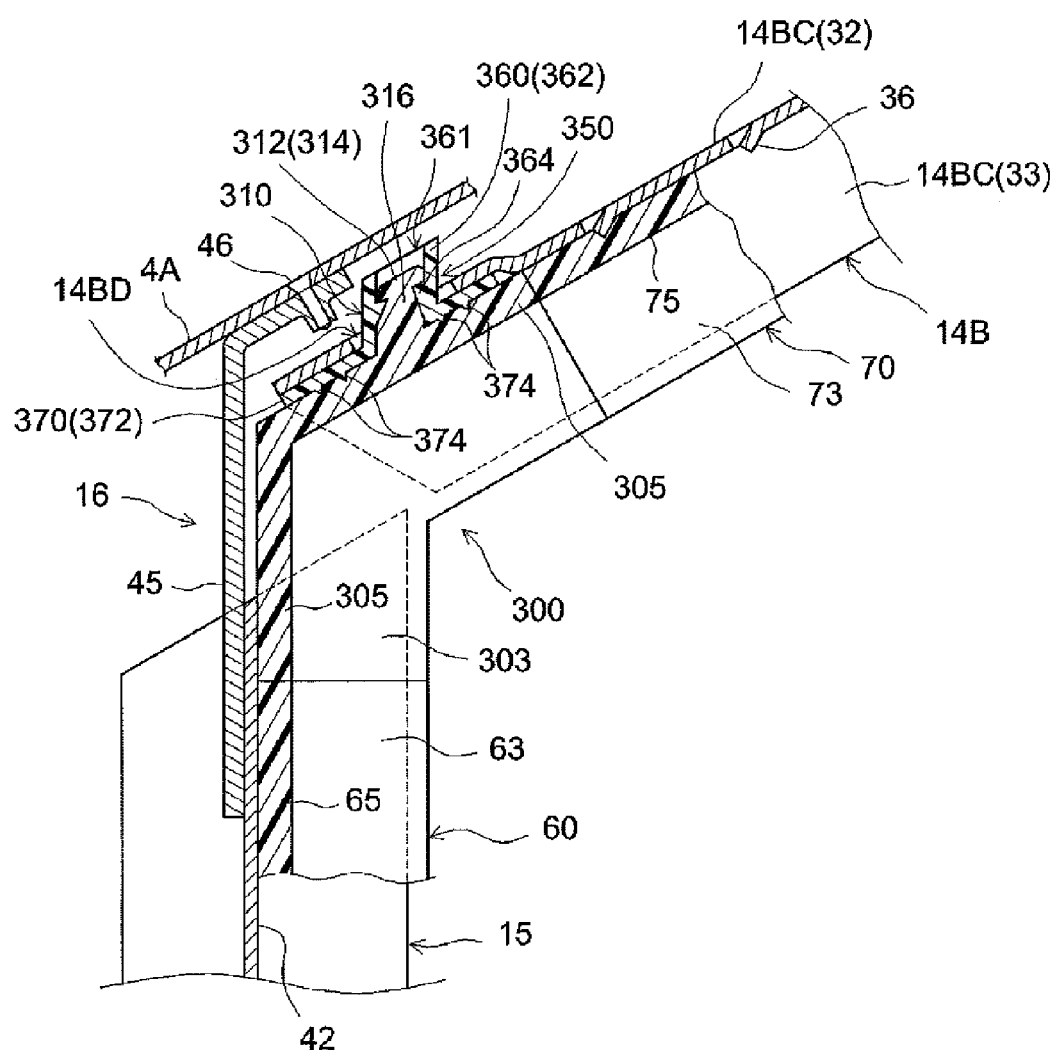
FIG. 7 is a longitudinal sectional view schematically showing the configuration and the mounting state of a connecting glass run channel according to the second embodiment of the present invention.

FIG. 7 is a longitudinal sectional view when a state where a connecting glass run channel 300 according to this embodiment is arranged at the front corner portion 16 is seen from the exterior side, and is equivalent to FIG. 4 concerning the connecting glass run channel 100 according to the above-described first embodiment. In addition, even in FIG. 7 similarly to FIG. 4, in order to make the characteristic structure (i.e., the shape of the base bottom portion and the reinforcing member) of the connecting glass run channel 300 according to the second embodiment easily understood, illustration of the accessory portions, which are provided in the interior side wall portion and exterior side wall portion, such as the above-described seal lips and concealing lips essentially provided in the various glass run channels 60, 70, and 300 shown on the drawings is omitted.

Similarly to the first embodiment, the connecting glass run channel 300 according to this embodiment is integrally formed between the terminal of the first long glass run channel 60 mounted in the groove (not shown) of the partition frame 15, and the terminal of the second long glass run channel 70 mounted in the groove 14BS (refer to FIG. 3) of the slant frame portion 14B. Also, the connecting glass run channel 300 according to this embodiment has exterior side wall portions (not shown), a base bottom portion 305 and an interior side wall portion 303, connected respectively to the end faces of exterior side wall portions (not shown), the base bottom portions 65 and 75 and the interior side wall portions 63 and 73 of both the first and second glass run channels 60 and 70 which are adjacent to each other.

As shown in the drawing, the projection portion 310 according to this embodiment is formed in the position of the slant frame portion 14B which faces the stopper 14BC (32) that is a window frame component member. Specifically, the projection portion 310 in this embodiment includes a protrusion portion 312 which projects toward the outer circumferential direction from the outer circumferential side surface of a base bottom portion 305, and a reinforcing member 350 according to this embodiment which will be described later. The protrusion portion 312 is formed with a fitting head portion 314 which projects in a direction which intersects the axial direction of this protrusion portion 312, and a retaining recess (also referred to as a neck portion) 316 whose outer shape is smaller than the fitting head portion 314.

Additionally, the outer circumferential side surface of the base bottom portion 305 around the protrusion portion 312 is equivalent to a base support portion which supports a base portion 370 of the reinforcing member 350 which will be described later. In the illustrated form, the base support portion is the outer circumferential side surface itself outside the base bottom portion 305. However, as in the first embodiment, the base support portion may be formed on the outer surface of the base bottom portion 305 in a recessed shape that the base portion 370 of the reinforcing member 350 can be fitted (specifically, so as to have a step recessed towards the inner circumferential side in a position which comes into contact with at least a portion of the periphery of the base portion 370 of the reinforcing member 350).

Figure 8:
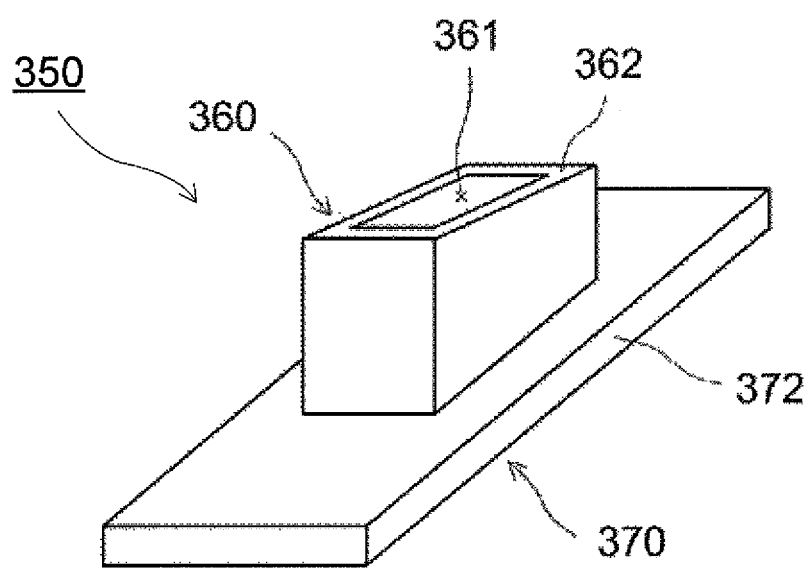
FIG. 8 is a perspective view schematically showing the configuration of a reinforcing member according to the second embodiment of the present invention.

Next, the reinforcing member 350 according to this embodiment equipped in the projection portion 310 will be described with reference to the drawings. FIG. 8 is a perspective view schematically showing the configuration of the reinforcing member 350 according to this embodiment.

The reinforcing member 350 according to this embodiment is a material which is harder and more rigid than the polymeric material of the connecting glass run channels, and which is formed in advance from polymeric materials, for example, such as polyacetal (POM) and nylon (polyamide-based resin) and a separate member (or may be a press-formed article made of metallic material, a cast, a forged article, etc.), and as shown in FIG. 8, has a flat board base portion 370 and a trunk portion 360 which projects in a direction away from the base portion 370.

A flat board main portion 372 of the base portion 370 is molded with a size and shape (here, a rectangular flat plate) suitable for being arranged around the protrusion portion 312, and has a plurality of displacement suppression protrusions 374 formed on the surface which faces the base bottom portion 305 (FIG. 7). Meanwhile, the trunk portion 360 is composed of a trunk hole 361 which has a size such that the protrusion portion 312 formed in the base bottom portion 305 can be inserted and the shape of the opening of which is a rectangular shape corresponding to the protrusion portion 312, and a main portion 362 which has a cavity inside and constitutes a surrounding wall of the trunk hole 361. The trunk hole 361 according to this embodiment is formed along an axial direction in which the trunk portion 360 projects from the base portion 370. Additionally, engagement projections 364 that are inward convex portions formed so as to project in the direction of the trunk hole 361 are formed on a pair of mutually facing inner wall surfaces among the inner walls form the trunk hole 361 of the main portion 362 (FIG. 7).

As shown in FIG. 7, the reinforcing member 350 having this configuration is mounted in a predetermined position on the outer circumferential side surface of the base bottom portion 305 as the protrusion portion 312 is fitted into the trunk hole 361 from the base portion 370. In this case, the displacement of the reinforcing member 350 can be prevented as the displacement suppression protrusions 374 of the base portion 370 stick into the outer circumferential side surface of the base bottom portion 305 (preferably sticks such that a portion of the base bottom portion 305 is deformed). Additionally, as shown in FIG. 7, a portion (here, fitting head portion 314) of the protrusion portion 312 inserted into the trunk hole 361 is brought into press-contact with the inner wall surface of the trunk hole 361, and the engagement projections 364 formed on the inner wall surfaces come into contact with a retaining recess (neck portion) 316 of the protrusion portion 312 (specifically, is retained in the retaining recess (neck portion) 316 of the protrusion portion 312), whereby the reinforcing member 350 is fixed at a predetermined mounting position in the outer circumferential side surface of the base bottom portion as shown in FIG. 7.

Meanwhile, the same engagement hole 14BD as that of the first embodiment is formed in the position of the stopper 14BC corresponding to the projection portion 310. Thereby, in a case where the connecting glass run channel 300 has moved (displaced) along the slant frame portion 14B in the longitudinal direction (a direction in which the horizontal frame portion 14A exists), the external wall surface of the projection portion 310, i.e., in this embodiment, the external wall surface of the trunk portion 360 of the reinforcing member 350 comes into contact with the circumferential edge of the engagement hole 14BD. By this contact, the movement of the connecting glass run channel 300 is restricted, and any excessive displacement can be prevented. In addition, similarly to the first embodiment, although the intersection angle θ between the projecting direction of the trunk portion 360 (main portion 362) in the reinforcing member 350 and the stopper 14BC may be perpendicular, as shown in the drawing, it is preferable that the projecting direction of the trunk portion 360 (main portion 362) is determined so that the intersection angle θ becomes an acute angle.

Additionally, in the reinforcing member 350 according to this embodiment described above, the inner wall surfaces of the main portion 362 of the trunk portion 360 is formed with the engagement projections 364. However, a main portion 362 with no such projections may be provided. In that case, by forming the protrusion portion 312 on the base bottom portion 305 with a larger diameter than the trunk hole 361, the reinforcing member 350 can be fixed in a predetermined position by frictional force caused by the press-contact of the protrusion portion 312 with the main portion 362 when the protrusion portion 312 is inserted into the trunk hole 361.

In the connecting glass run channel 300 according to this embodiment having a configuration in which such a reinforcing member 350 is mounted on the projection portion 310, a separate member molded in advance as a hard reinforcing member 350 is used. Thereby, unlike the configuration in which the projection portion is integrally molded by an injection molding method within a molding die into which an insert member is inserted as in the above-described conventional example, the projection portion 310 which has excellent mechanical strength can be formed by virtue of the easy operation of mounting the reinforcing member 350 in a predetermined position of the connecting glass run channel. Also, since the reinforcing member 350 may be attached to the outer circumferential side surface (the protrusion portion 312 and its periphery) of the base bottom portion 305 which constitutes the main portion of the connecting glass run channel 300 afterward, the constraints of the material and shape which constitute the reinforcing member 350 can be reduced, and the reinforcing member 350 can be attached by an easy and simple operation.

In the first and second embodiments described, an exclusive member is manufactured and used as the reinforcing member. However, a form in which an existing member is used as the reinforcing member may be adopted. Hereinafter, as a third embodiment, a case where the reinforcing member is a general male screw (or a small screw, the male screw and small screw are generically referred to as a screw) will be described.

A preferred example of a connecting glass run channel including a reinforcing member composed of a male screw will be described below as a third embodiment with reference to drawings. In the drawings which describe this embodiment, the same reference numerals are given to substantially the same members and mechanisms as those of the first and second embodiments, and redundant description is omitted.

Figure 9:
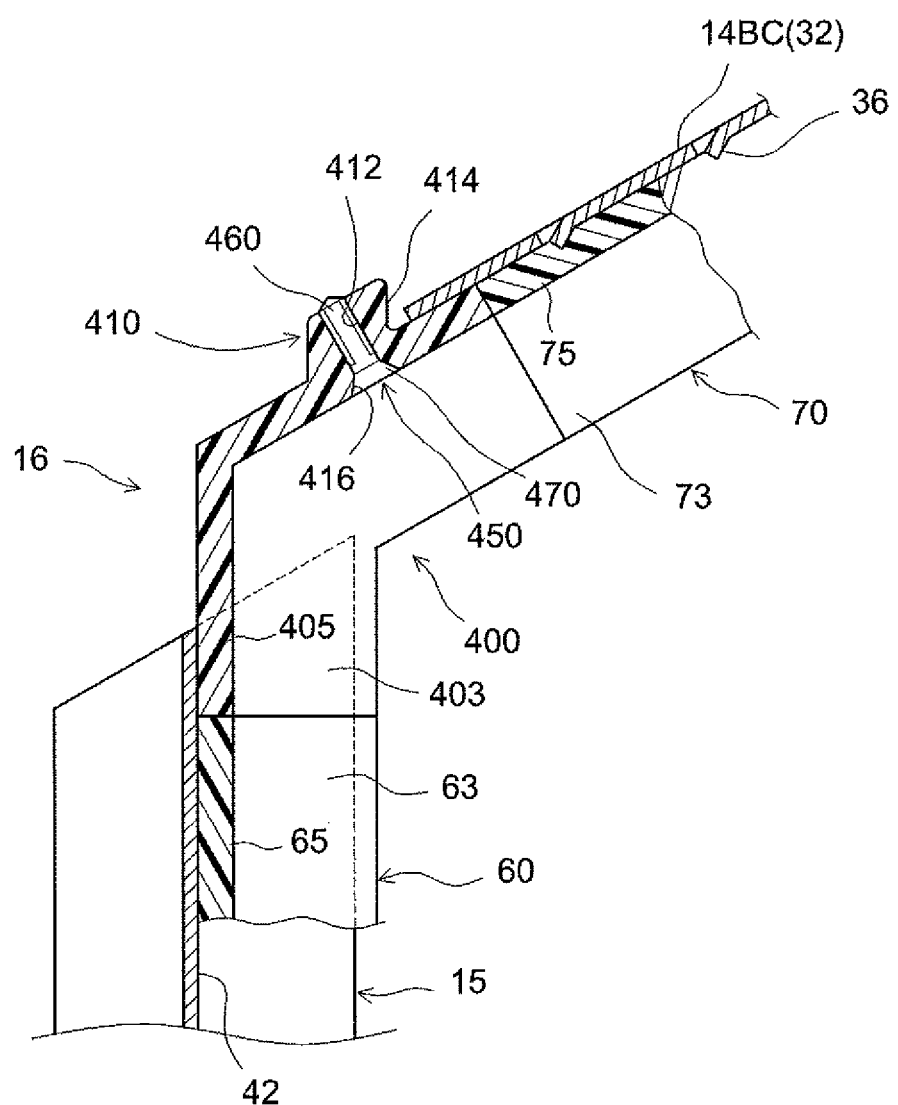
FIG. 9 is a longitudinal sectional view schematically showing the configuration and the mounting state of a connecting glass run channel according to the third embodiment of the present invention.
Figure 10:
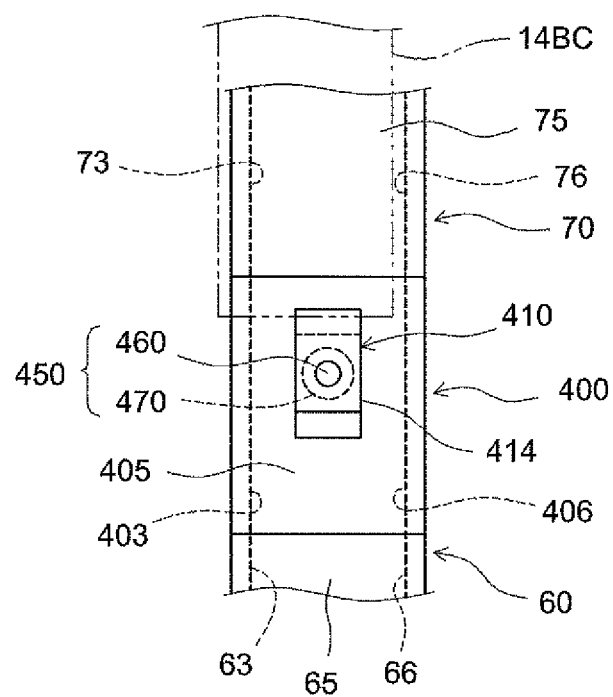
FIG. 10 is a plan view showing chief portions of the connecting glass run channel seen from the outer circumferential side of the base bottom portion according to the third embodiment of the present invention.

FIG. 9 is a longitudinal sectional view when a state where a connecting glass run channel 400 according to this embodiment is arranged at the front corner portion 16 (the description of the front door inner panel, etc. which are the same as the first embodiment is omitted) is seen from the exterior side, and is equivalent to FIG. 4 concerning the connecting glass run channel 100 according to the above-described first embodiment. Additionally, FIG. 10 is a schematic plan view when chief portions of the connecting glass run channel 400 are seen from the outer circumferential side of the base bottom portion 405.

In addition, in FIG. 9 similarly to FIG. 4, in order to make the characteristic structure (i.e., the contents of the base bottom portion and reinforcing member) of the connecting glass run channel 400 according to the third embodiment easily understood, illustration of the accessory portions, which are provided in the interior side wall portion and exterior side wall portion (not shown), such as the above-described seal lips and concealing lips essentially provided in the various glass run channels 60, 70, and 400 shown on the drawings is omitted.

Similarly to the first embodiment, the connecting glass run channel 400 according to this embodiment is integrally formed between the terminal of the first long glass run channel 60 mounted in the groove (not shown) of the partition frame 15, and the terminal of the second long glass run channel 70 mounted in the groove 14BS (refer to FIG. 3) of the slant frame portion 14B. As shown in FIG. 10, the connecting glass run channel 400 according to this embodiment has exterior side wall portions 406, a base bottom portion 405 and an interior side wall portion 403 continuously integrated respectively with exterior side wall portions 66 and 76, the base bottom portions 65 and 75 and the interior side wall portions 63 and 73 of both the first and second glass run channels 60 and 70 which are adjacent to each other.

As shown in the drawing, a projection portion 410 according to this embodiment is provided in the position of the slant frame portion 14B adjacent to the end of the stopper 14BC that is a window frame component member. Specifically, the projection portion 410 in this embodiment includes a screw insertion hole 412 that is a through hole which passes through a base bottom portion 405, a protrusion portion 414 that is a protrusion portion which projects towards the outer circumferential side of the base bottom portion and which constitutes a surrounding wall of the insertion hole 412, and a reinforcing member (screw) 450. In the reinforcing member (screw) 450 composed of the male screw according to this embodiment, its screw head portion constitutes a base portion 470, and its screw main portion (shaft portion of the screw) constitutes a trunk portion 460. Meanwhile, a contacting recess 416 which corresponds to a base support portion which supports a head portion (i.e., base portion 470) of the screw is formed around the screw insertion hole 412 on the inner circumferential side of the base bottom portion 405 (specifically, so as to have a step recessed towards the outer circumferential side in a position which comes into contact with at least a portion of the periphery of the base portion 470 of the reinforcing member 450).

As shown in FIG. 9, the reinforcing member (male screw) 450 having this configuration can be simply mounted in a predetermined position (i.e., the cylindrical boss 414 that is a protrusion portion) by screwing the shaft portion of the screw (trunk portion) 460 into the screw insertion hole 412 from the inner circumferential side of the base bottom portion 405 while being inserted into the screw insertion hole. In this embodiment, the male screw 450 which has the shaft portion of the screw is used as the reinforcing member. However, instead of the screw, for example, a nail can also be used by providing a suitable projection preventing slip-off on the outer surface of a shaft portion.

Moreover, since a male screw is an inexpensive member and can be fixed just by screwing, the object of the invention can be realized with superior cost performance.

In this embodiment, the longitudinal end (edge portion) of the stopper 14BC is arranged adjacent to the above projection portion 410 as an engaging portion. Thereby, in a case where the connecting glass run channel 400 has moved in the longitudinal direction (a direction in which the horizontal frame portion 14A exists), the external wall surface of the projection portion 410 strikes the end (edge portion) of the stopper 14BC. As a result, the movement of the connecting glass run channel 400 is restricted, and any excessive displacement can be prevented.

Although several typical embodiments have been described above in detail with reference to the drawings, the invention is not limited to the above first to third embodiments. Hereinafter, further several embodiments included in the invention will be described.

Figure 11:
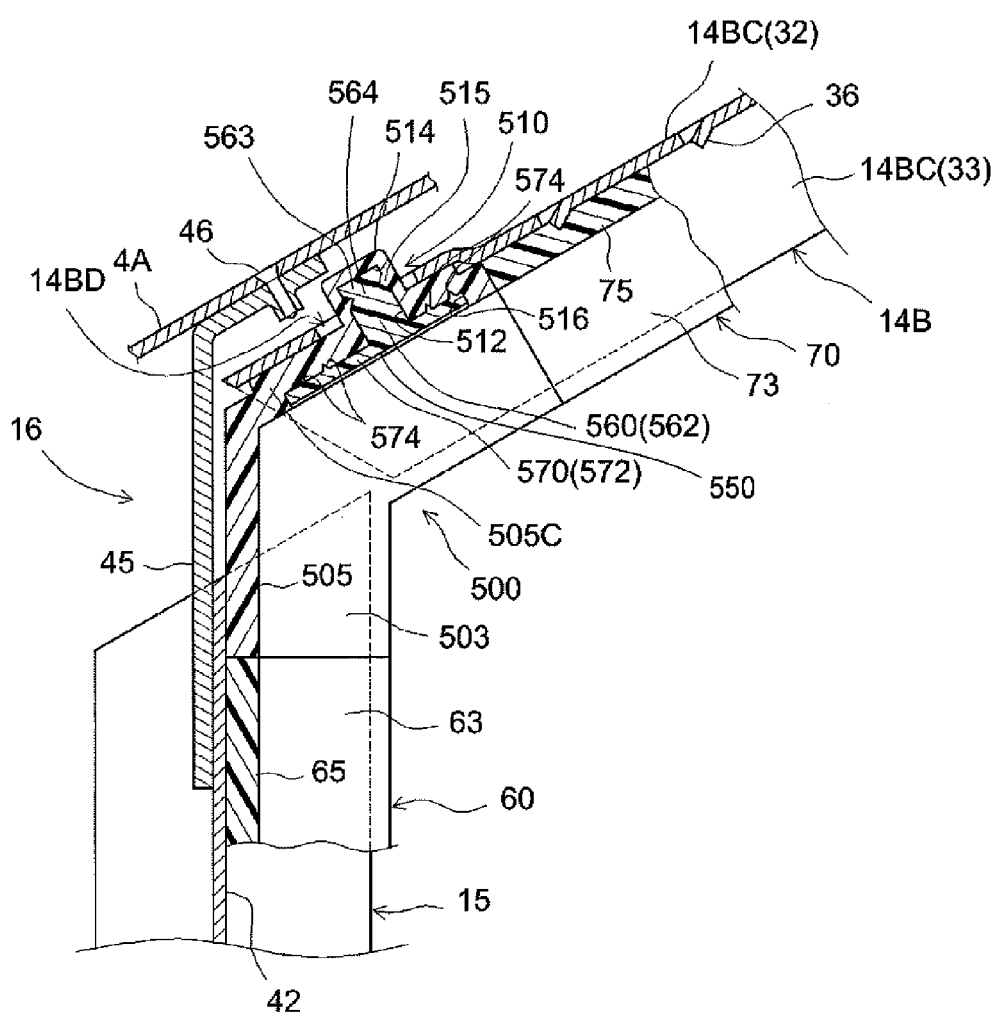
FIG. 11 is a longitudinal sectional view schematically showing the configuration and the mounting state of a connecting glass run channel according to the fourth embodiment of the present invention.

FIG. 11 shows a connecting glass run channel 500 according to a fourth embodiment of the invention, and a connecting glass run channel 500 understood also as a modification of the first embodiment. In the drawings which describe this embodiment, the same reference numerals are given to substantially the same members and mechanisms as those of any of the above-described embodiments, and redundant description is omitted.

Similarly to the first embodiment, the connecting glass run channel 500 according to this embodiment is integrally formed between the terminal of the first long glass run channel 60 mounted in the groove (not shown) of the partition frame 15, and the terminal of the second long glass run channel 70 mounted in the groove 14BS (refer to FIG. 3) of the slant frame portion 14B. Also, the connecting glass run channel 500 according to this embodiment has exterior side wall portions (not shown), a base bottom portion 505 and an interior side wall portion 503, continuously integrated respectively with exterior side wall portions (not shown), the base bottom portions 65 and 75 and the interior side wall portions 63 and 73 of both the first and second glass run channels 60 and 70 which are adjacent to each other.

A base bottom portion 505 of the connecting glass run channel 500 according to this embodiment is formed with a thicker wall portion 505C than adjacent portions. This thicker wall portion 505C is formed with a projection portion 510 of this embodiment.

That is, as shown in FIG. 11, the projection portion 510 which projects from the outer circumferential side surface of the base bottom portion 505 is provided substantially at the center of the thicker wall portion 505C. Specifically, the projection portion 510 in this embodiment includes a rectangular-parallelepiped-shaped protrusion portion 514 which projects toward the outer circumferential direction from the outer circumferential side surface of the base bottom portion 505, and a reinforcing member 550 according to this embodiment which will be described later. The inside of the protrusion portion 514 is formed with an insertion hole 512 that is a non-through hole which opens towards the inner circumferential side of the base bottom portion 505, and is blocked on the outer circumferential side of the base bottom portion 505. The inner wall surface of the insertion hole 512 is formed with a pair of engagement projections 515.

Additionally, similarly to the first embodiment, a contacting recess 516 which corresponds to a base support portion which supports a base portion 570 of the reinforcing member 550 which will be described later is formed around the opening on the inner circumferential side of the insertion hole 512 of the base bottom portion 505 (specifically, so as to have a step recessed towards the outer circumferential side in a position which comes into contact with at least a portion of the periphery of the base portion 570 of the reinforcing member 550 (hereinafter simply referred to as "recess")). This recess 516 is formed within a wider range than the base portion 570 with a shape corresponding to the outer shape of the base portion 570 of the reinforcing member 550.

Meanwhile, the reinforcing member 550 according to this embodiment is the same as the reinforcing member 150 according to the first embodiment in terms of fundamental configuration and material, and has a flat board base portion 570 and a trunk portion 560 which projects in a direction away from the base portion 570.

A flat board main portion 572 of the base portion 570 is molded with a size and shape such that the main portion is fitted into the above recess (base support portion) 516, and has a plurality of displacement suppression protrusions 574 formed on the surface which faces the base bottom portion 505.

Meanwhile, the trunk portion 560 has a main portion 562 of an outer shape (rectangular parallelepiped shape in this embodiment) with a size such that the main portion can be inserted into the insertion hole 512 as the above non-through hole. The main portion 562 is formed with a fitting head portion 563, and a retaining recess (also referred to as a neck portion) 564 which is constricted more than other portions over its entire circumference (i.e., the outer shape of the retaining recess is smaller than the fitting head portion 563). In addition, similarly to the first embodiment, it is preferable from the viewpoint of prevention of slip-out that the outer shape (size and thickness) of the main portion 562 of the trunk portion 560 does not fall below the size of the above insertion hole 512.

As shown in FIG. 11, the reinforcing member 550 having this configuration is mounted in a predetermined position on the inner circumferential side surface of the base bottom portion 505 while the trunk portion 560 is inserted into the insertion hole 512. In this case, the displacement of the reinforcing member 550 can be prevented as the displacement suppression protrusions 574 of the base portion 570 bump against and stick into the recess (base support portion) 516 of the inner circumferential side surface of the base bottom portion 505. In addition, marking for exactly determining the positions where the displacement suppression protrusions 574 are made to stick may be performed in the inner circumference surface of the base bottom portion 505. For example, an engraved mark or a positioning recess serving as a mark may be provided in advance in the inner circumferential surface of the base bottom portion 505 (i.e., the protrusions 574 are brought into contact with the positioning recess). This makes it possible to facilitate the positioning which makes the displacement suppression protrusions 574 stick. Additionally, when the reinforcing member 550 is arranged in a predetermined position, it is preferable that the base portion 570 of the reinforcing member 550 arranged in the recess (base support portion) 516 is arranged within the recess 516 without coming out further in the inner circumferential direction than the inner circumferential side surface of the base bottom portion 505 (as shown in the drawing). In other words, in the attachment state of the reinforcing member 550, it is preferable that the contacting recess 516 is arranged so that the base portion 570 retreat further toward the outer circumferential side than the inner circumferential side surface of the base bottom portion 505 (the same is also true in the above first embodiment and its modification). This makes it possible to avoid that the window pane 3A which moves up and down strikes the reinforcing member. [0078]

Additionally, by the frictional force caused as a portion (here, the fitting head portion 563 of the main portion 562) of the trunk portion 560 inserted into the insertion hole 512 are brought into press-contact with the inner wall surface of the insertion hole 512 and the engaging projections 515 are fitted into the retaining recess 564 as shown in the drawing, and as the engagement projections 515 elastically deform and stick into the retaining recess 564, the reinforcing member 550 is fixed in the mounting position as shown in FIG. 11.

Meanwhile, the same engagement hole 14BD as that of the first embodiment is formed in the position of the stopper 14BC corresponding to the projection portion 510. Thereby, in a case where the connecting glass run channel 500 has moved (displaced) in the longitudinal direction (a direction in which the horizontal frame portion 14A exists) along the slant frame portion 14B, the external wall surface of the projection portion 510, i.e., in this embodiment, the external wall surface of the protrusion portion 514 comes into contact with the circumferential edge of the engagement hole 14BD. By this contact, the movement of the connecting glass run channel 500 is restricted, and any excessive displacement can be prevented.

Meanwhile, since the reinforcing member is not exposed to the outer circumferential side of the base bottom portion, a hard reinforcing member (trunk portion) does not come into direct contact with the window frame component member. For this reason, there is no case that a coating film on the window frame component member is peeled off. Moreover, water drops can be prevented from entering the groove of the glass run channel.

Figure 12:
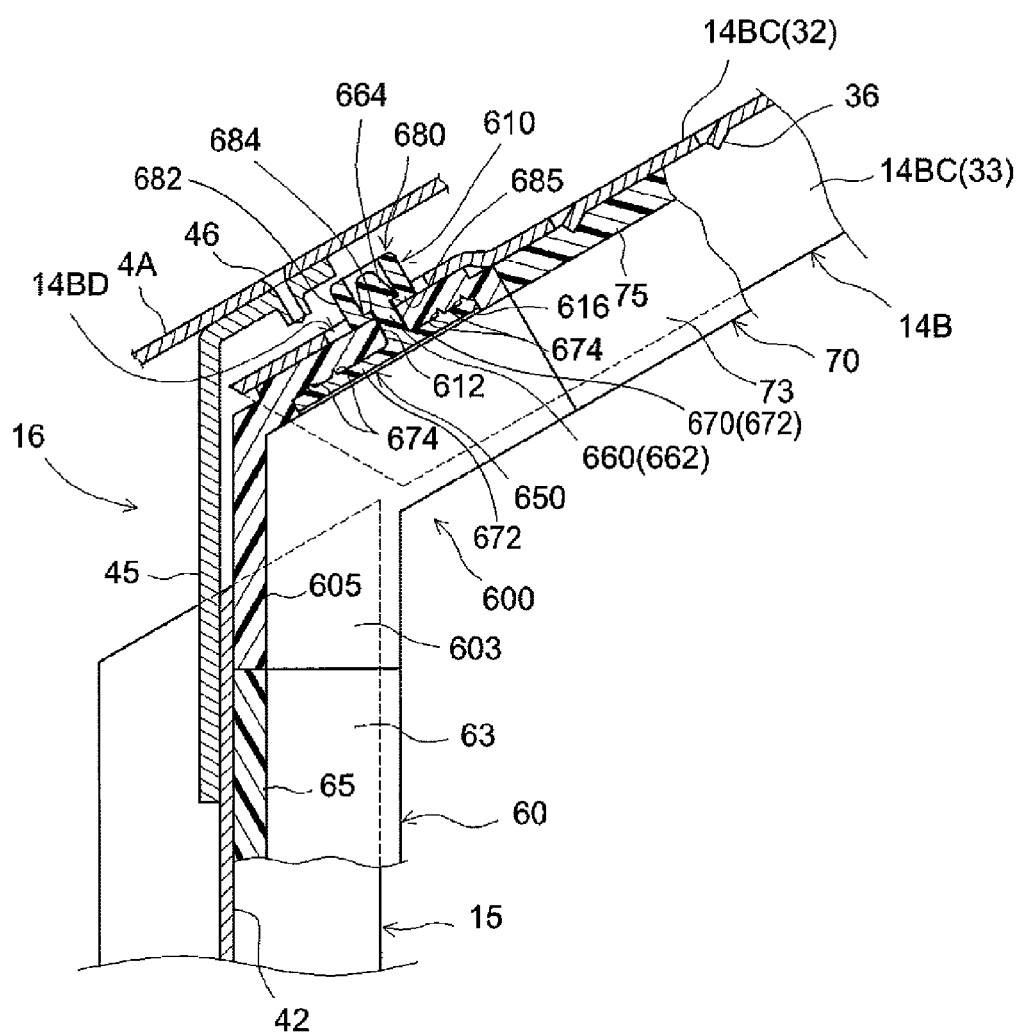
FIG. 12 is a longitudinal sectional view schematically showing the configuration and the mounting state of a connecting glass run channel according to the fifth embodiment of the present invention.

Although a form in which a portion of the reinforcing member and a portion of the base bottom portion (a portion which constitutes the projection portion) are directly engaged with each other has been described in all of the above-described embodiments, the invention is not limited to this form, and the reinforcing member may be fixed to the base bottom portion by using a member which is separately formed. FIG. 12 is a view illustrating a connecting glass run channel 600 according to a fifth embodiment of the invention.

As shown in FIG. 12, this embodiment is characterized by making a separate member and the reinforcing member 650 fit each other, thereby engaging the reinforcing member 650 with the base bottom portion 605. Hereinafter, this will be specifically described.

Similarly to the first embodiment, the connecting glass run channel 600 according to this embodiment is integrally formed between the terminal of the first long glass run channel 60 mounted in the groove (not shown) of the partition frame 15, and the terminal of the second long glass run channel 70 mounted in the groove 14BS (refer to FIG. 3) of the slant frame portion 14B. Also, the connecting glass run channel 600 according to this embodiment has exterior side wall portions (not shown), a base bottom portion 605 and an interior side wall portion 603 connected respectively to exterior side wall portions (not shown), the base bottom portions 65 and 75 and the interior side wall portions 63 and 73 of both the first and second glass run channels 60 and 70 which are adjacent to each other.

As shown in the drawing, a projection portion 610 according to this embodiment is provided in the position of the slant frame portion 14B which faces the stopper 14BC that is a window frame component member. Specifically, the projection portion 610 in this embodiment includes an insertion hole 612 that is a through hole through which the base bottom portion 605 pass from the inner circumferential side towards the outer circumferential side, the reinforcing member 650 according to this embodiment which will be described later, and an engagement cap 680 that is a fitting member which will be described later. Additionally, similarly to the first embodiment, a contacting recess 616 which corresponds to a base support portion which supports a base portion 670 of the reinforcing member 650 which will be described later is formed around the opening on the inner circumferential side of the insertion hole 612 of the base bottom portion 605 (specifically, so as to have a step recessed towards the outer circumferential side in a position which comes into contact with at least a portion of the periphery of the base portion 670 of the reinforcing member 650.

Meanwhile, the reinforcing member 650 according to this embodiment is same as the reinforcing member 150 according to the first embodiment in terms of fundamental configuration and material, and has a flat board base portion 670 and a trunk portion 660 which projects in a direction away from the base portion 670.

A flat board main portion 672 of the base portion 670 is molded with a size and shape such that the main portion is fitted into the above recess (base support portion) 616, and has a plurality of displacement suppression protrusions 674 formed on the surface which faces the base bottom portion 605.

Meanwhile, the trunk portion 660 has a main portion 662 with a size (rectangular parallelepiped shape in this embodiment) such that the main portion can be inserted into the insertion hole 612. Additionally, engagement projections 664 which project in a direction which intersects an axial direction in which the trunk portion 660 projects from the base portion 670 are formed on the outer surface of the tip portion of the trunk portion 660 (main portion 662).

As shown in FIG. 12, the reinforcing member 650 having this configuration is mounted in a predetermined position on the inner circumferential side surface of the base bottom portion 605 while the trunk portion 660 is inserted into the insertion hole 612. In this case, the displacement of the reinforcing member 650 can be prevented as the displacement suppression protrusions 674 of the base portion 670 bump against and stick into the recess (base support portion) 616 on the surface on the inner circumferential side of the base bottom portion 605 (preferably sticks such that a portion of the base bottom portion 605 is deformed). Additionally, when the reinforcing member 650 is arranged in a predetermined position, it is preferable that the surface of the base portion 670 of the reinforcing member 650 arranged in the recess (base support portion) 616 does not project further in the inner circumferential direction turns toward the center of the window opening than the inner circumferential side surface of the base bottom portion 605 (as shown in the drawing). In other words, in the attachment state of the reinforcing member 650, it is preferable that the contacting recess 616 is arranged so that the surface of the base portion 670 retreats further outward than the inner circumferential side surface of the base bottom portion 605. This makes it possible to avoid that the window pane 3A which moves up and down strikes the reinforcing member.

In this embodiment, as shown in the drawing, the tip portion (i.e., engagement projections 664) of the trunk portion 660 passes through the insertion hole 612, and is exposed to the outer circumferential side surface of the base bottom portion 605.

Here, in this embodiment, an engagement cap 680 serving as a fitting member is arranged on the outer circumferential side of the base bottom portion. This engagement cap (typically made of synthetic resin) 680 is composed of a bottom portion 685 including an insertion hole 684 of an opening shape corresponding to the cross-sectional shape (here, rectangular shape) of the trunk portion 660, and a main portion 682 which has a cavity inside. In this embodiment, although the opposite side of the bottom portion 685 in the main portion 682 is opened, it may have a closed form.

As shown in FIG. 12, the engagement projections 664 which have passed through the above insertion hole 612 are inserted into the insertion hole 684 of the engagement cap 680 which is arranged on the outer circumferential side of the base bottom portion 605. The engagement projections 664 are slightly deformed when they are inserted into the insertion hole 684. Also, as the engagement projections 664 inserted through the insertion hole 684 while deforming a surrounding wall of the insertion hole 684 return to their original states in the inner space of the main portion 682, and the engagement projections 664 come into contact with (engaged with) the surrounding wall of the insertion hole 684, slip-out of the engagement projections 664 from the engagement cap 680 is prevented. As a result, the trunk portion 660 and the engagement cap 680 fit each other in a state where the base bottom portion 605 is sandwiched therebetween, and simultaneously, the fixation of the reinforcing member 650 in a predetermined position is realized. Here, the trunk portion 660 and the engagement cap 680 may be made to fit each other by deforming the engagement projections 664. However, the engagement cap 680 may be deformed, or both the engagement projections 664 and the engagement cap 680 may be deformed.

Meanwhile, the same engagement hole 14BD as that of the first embodiment is formed in the position of the stopper 14BC corresponding to the projection portion 610. Thereby, in a case where the connecting glass run channel 600 has moved (displaced) along the slant frame portion 14B in the longitudinal direction (a direction in which the horizontal frame portion 14A exists), the external wall surface of the projection portion 610, i.e., in this embodiment, the external wall surface of the engagement cap 680 which fits to the trunk portion 660 of the reinforcing member 650 comes into contact with the circumferential edge of the engagement hole 14BD. By this contact, the movement of the connecting glass run channel 600 is restricted, and any excessive displacement can be prevented.

Although the various embodiment according to the invention have been described above, all of the above-described embodiments relate to a glass run channel assembly formed in a door frame (also referred to as a press door frame) formed integrally with a door panel by press working. However, the application of the invention is not limited to such a panel door. For example, the invention is suitably applied to a door frame (also referred to as a sash door frame) made from a sash (i.e., long material obtained by bending a band steel plate in a predetermined cross-sectional shape by cold roll forming method).

Figure 13:
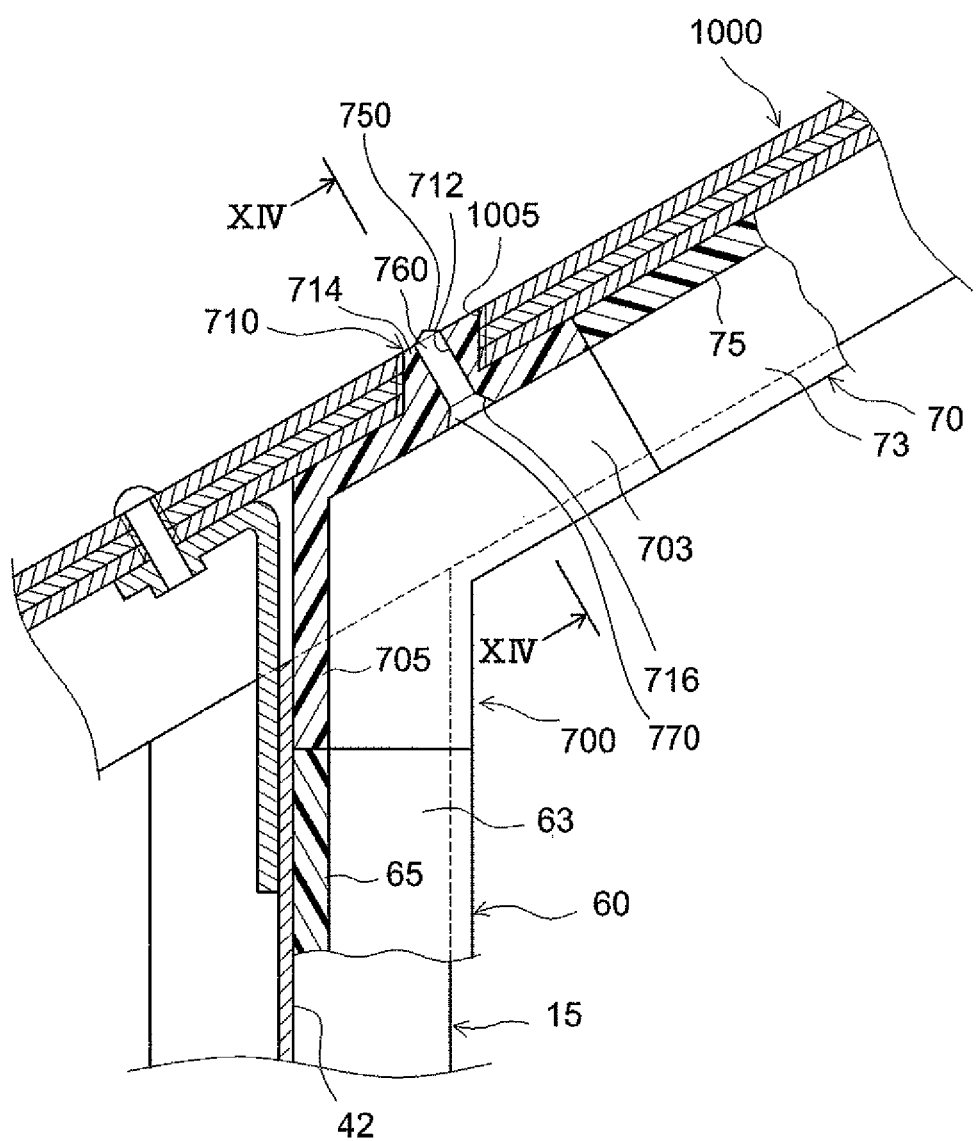
FIG. 13 is a longitudinal sectional view schematically showing the configuration and the mounting state of a connecting glass run channel according to the sixth embodiment of the present invention.
Figure 14:
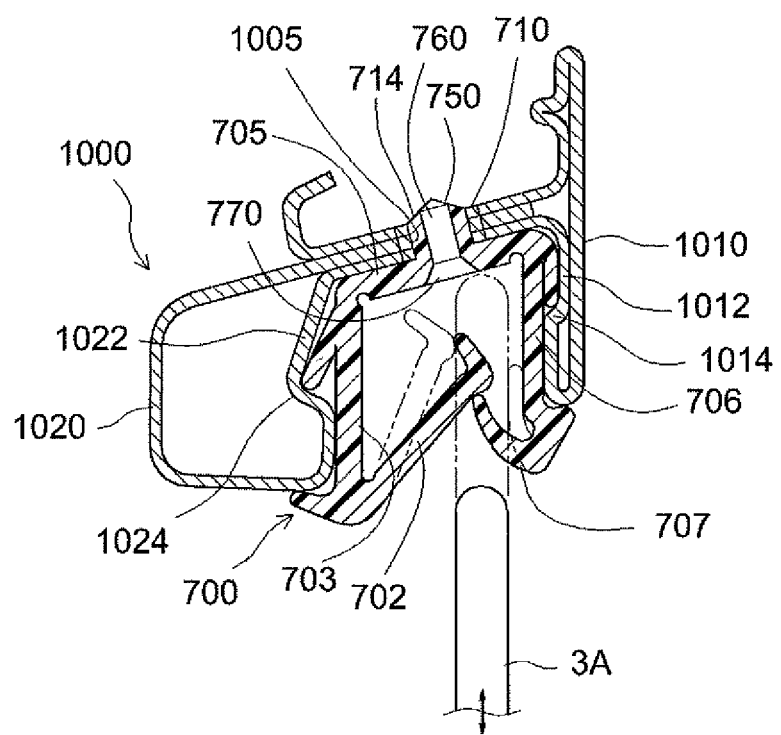
FIG. 14 is a cross-sectional view taken along the line XIV-XIV in FIG. 13.

For example, the glass run channel assembly according to the third embodiment (i.e., an assembly which is characterized in including a reinforcing member composed of a male screw) described above can also be preferably applied to a sash door frame. FIGS. 13 and 14 are views showing an example (sixth embodiment) of this assembly.

As shown in FIG. 13, a connecting glass run channel 700 of the same configuration as the third embodiment can be mounted even on the front corner portion 16 in a front sash door frame 1000.

That is, FIG. 13 is a longitudinal sectional view when a state where a connecting glass run channel 700 according to this embodiment is arranged at the front corner portion 16 is seen from the exterior side, and is equivalent to FIG. 4 concerning the connecting glass run channel 100 according to the above-described first embodiment. Additionally, FIG. 14 is a cross-sectional view taken along the line XIV-XIV in FIG. 13. In addition, even in FIG. 13 similarly to FIG. 4, in order to make the characteristic structure (i.e., the contents of the base bottom portion and a reinforcing member) of the connecting glass run channel 700 according to the sixth embodiment easily understood, illustration of the accessory portions, which are provided in the interior side wall portion and exterior side wall portion, such as the above-described seal lips and concealing lips essentially provided in the various glass run channels 60, 70, and 700 shown on the drawings is omitted.

Similarly to the first embodiment, the connecting glass run channel 700 according to this embodiment is integrally formed between the terminal of the first long glass run channel 60 mounted in the groove (not shown) of the sash-type partition frame 15, and the terminal of the second long glass run channel 70 mounted in the groove 14BS (refer to FIG. 3) of the slant frame portion 14B. Similarly to the other embodiments, the connecting glass run channel 700 according to this embodiment has exterior side wall portions (not shown), a base bottom portion 705 and an interior side wall portion 703, respectively connected to exterior side wall portions 706, the base bottom portions 65 and 75 and the interior side wall portions 63 and 73 of both the first and second glass run channels 60 and 70 which are adjacent to each other.

As shown in the drawing, a projection portion 710 according to this embodiment is provided in the position of the slant frame portion 14B corresponding to an engagement hole 1005 provided in the front sash door frame 1000 that is a window frame component member. Specifically, the projection portion 710 in this embodiment is the same as that of the third embodiment. That is, the projection portion 710 includes a screw insertion hole 712 that is a through hole which passes through a base bottom portion 705, a cylindrical boss 714 that is a protrusion portion which projects towards the outer circumferential side of the base bottom portion 705 and which constitutes a surrounding wall of the insertion hole 712, and a reinforcing member (male screw) 750. A screw head portion of the reinforcing member constitutes a base portion 770, and a screw main portion (shaft portion of the screw) of the reinforcing member constitutes a trunk portion 760. Meanwhile, a recess 716 equivalent to the base support portion which supports the head portion (i.e., base portion 770) of the screw is formed around the opening on the inner circumferential side of the screw insertion hole 712 of the base bottom portion 705.

As shown in FIG. 13, the reinforcing member 750 having this configuration can be simply mounted in a predetermined position by screwing the shaft portion of the screw (trunk portion) 760 into the screw insertion hole 712 from the inner circumferential side of the base bottom portion 705 while being inserted into the screw insertion hole.

In this embodiment, the projection portion 710 into which the reinforcing member (male screw) 750 is inserted (screwed) is mounted on the engagement hole 1005. Thereby, since the connecting glass run channel 700 is fixed to the slant frame portion (sash frame) 1413, the movement (displacement) of the glass run channel in the longitudinal direction can be prevented. This state is shown in a cross-sectional view of FIG. 14. Since the invention is not characterized by the configuration of the sash door frame 1000, further detailed description is omitted. Portions to which reference numerals are given in the drawings will be briefly described as follows. Reference numeral 1010 represents the outer surface of a door frame, reference numeral 1012 represents an outward projecting portion, reference numeral 1014 represents an exterior step portion, reference numeral 1020 represents the inner surface of a door frame, reference numeral 1022 represents an inward projecting portion, and reference numeral 1024 represents an interior step portion. Additionally, reference numeral 707 represents an exterior seal lip of the connecting glass run channel 700, and reference numeral 702 represents an interior seal lip of the connecting glass run channel 700.

Although specific examples of the invention have been described above in detail referring to the drawings, these examples are merely illustrative, and do not limit the claims thereof. The art set forth in the claims includes various alternations and modifications of the specific examples illustrated above.

For example, in the above-described respective embodiments, the reinforcing member is mounted on the connecting glass run channel 100 formed between the first glass run channel 60 and the second glass run channel 70. However, the reinforcing member may be mounted on other connecting glass run channels. Additionally, a required number of reinforcing members may be provided in required positions.

What is claimed is:

1. A glass run channel assembly capable of being mounted along an inside of a groove of a door frame of a vehicle and configured to guide a window pane that moves up and down within a door when mounted to the inside of the groove, the glass run channel assembly comprising:
   a first long glass run channel which is extrusion-molded, made of an elastic polymeric material and includes a terminal in a longitudinal direction thereof;
   a second long glass run channel which is extrusion-molded, made of an elastic polymeric material and includes a terminal in a longitudinal direction thereof;
   a connecting glass run channel which is injection-molded, made of an elastic polymeric material and connects the longitudinal terminals of the first and second long glass run channels; and
   an injection molded reinforcing member that is inserted into the connecting glass run channel and is made from a material harder and more rigid than the elastic polymeric material of the connecting glass run channel,
   wherein each of the first long glass run channel, the second long glass run channel, and the connecting glass run channel includes
      a base bottom portion arranged at a position which faces an end face of the window pane,
      a side wall portion that projects integrally toward an inner perimeter side from the base bottom portion with a predetermined intersection angle with respect to the base bottom portion from at least an interior end of the base bottom portion in a width direction of the base bottom portion, and
      a seal lip that projects toward the base bottom portion in a folded-back shape from a protruding end side of the side wall portion,
   a projection portion that projects from an outer perimeter side surface of the base bottom portion and engages with an engaging portion of a window frame component member provided within a groove of the window frame component member when the connecting glass run channel is mounted in a predetermined position of the window frame component member,
   the projection portion includes at least a portion of the reinforcing member,
   the reinforcing member includes a base portion arranged at the base bottom portion and a trunk portion that projects toward an outer perimeter side from the base portion,
   the base bottom portion includes a base support portion, which supports the base portion of the reinforcing member, at either an inner perimeter side surface or the outer perimeter side surface of the base bottom portion,
   the projection portion includes at least one of the following
      (1) an insertion hole which passes through inner and outer perimeter surfaces of the base bottom portion, and
      (2) a protrusion portion that projects toward an outer perimeter direction from the outer perimeter side surface of the base bottom portion,
   the base portion is supported by the base support portion and the trunk portion is fixed to a portion of the base bottom portion when the reinforcing member is arranged at the base bottom portion,
   the insertion hole is formed on the base bottom portion within the projection portion,
   the trunk portion is inserted into the insertion hole, and is fixed to a portion of the base bottom portion by at least one of being fit with the insertion hole and by friction with an inner wall surface of the insertion hole, the trunk portion includes a main portion and an engagement portion at an outer perimeter side of the main portion, the main portion projects from the base portion in an axial direction, at least a part of the engagement portion projects further than the main portion at a side surface of the main portion in a direction intersecting with the axial direction, a bottom plane of the engagement portion extends from the side surface of the main portion to an edge of the part of the engagement portion forming an overhang, the overhang of the engagement portion engages with only a portion of a peripheral edge of the insertion hole, the insertion hole is formed along an axial direction in which the projection portion projects from the base bottom portion, and the insertion hole is a through hole which passes through the base bottom portion in inner and outer perimeter directions.

2. The glass run channel assembly according to claim 1,
wherein the projection portion is formed in a shape such that the projection portion is inserted through an engagement hole serving as the engaging portion of the window frame component member, and at least the connecting glass run channel is mounted onto the window frame component member by inserting the projection portion through the engagement hole.

3. The glass run channel assembly according to claim 1,
wherein an outer shape of the trunk portion is formed to be the same as an inner shape of the insertion hole or larger than the inner shape of the insertion hole within an expandable range resulting from elastic deformation of the insertion hole.

4. The glass run channel assembly according to claim 1,
wherein the projection portion includes a fitting member which is separately formed from the reinforcing member and fits into the trunk portion, and the fitting member and the trunk portion cooperate in a state where the base bottom portion is sandwiched between the fitting member and the reinforcing member.

5. The glass run channel assembly according to claim 1,
wherein the protrusion portion is formed within the projection portion, and the trunk portion is fixed to a portion of the base bottom portion by at least one of being fit and by friction in the protrusion portion.

6. The glass run channel assembly according to claim 1,
wherein the base support portion of the base bottom portion has a step recessed toward the outer perimeter side in a position where the base support portion comes into contact with at least a portion of perimeter edge of the base portion of the reinforcing member.

7. The glass run channel assembly according to claim 6,
wherein the step of the base support portion constitutes a contacting recess which has a shape corresponding to outer shape of the base portion of the reinforcing member, and the contacting recess is larger than the outer shape of the base portion.

8. The glass run channel assembly according to claim 7,
wherein the contacting recess of the base support portion is formed so that the base portion of the reinforcing member is arranged to extend further in the outer circumferential direction than in the inner circumferential direction of the base bottom portion in an attachment state of the reinforcing member.

9. The glass run channel assembly according to claim 1,
wherein the reinforcing member is made of synthetic resin.

10. A window frame structure of a vehicle in which the glass run channel assembly according to claim 1 is mounted on the window frame component member of the vehicle.

11. The glass run channel assembly of claim 1, wherein:
the base portion of the reinforcing member is formed with a displacement suppression protrusion that projects toward the inner perimeter side surface or the outer perimeter side surface of the base bottom portion, and the displacement suppression protrusion deforms a portion of the base bottom portion and sticks into the base bottom portion in an attachment state of the reinforcing member.

12. The glass run channel assembly according to claim 1,
wherein the overhang is formed in an acute angle with respect to the bottom plane of the engagement portion and the edge of the part of the engagement portion.

13. The glass run channel assembly according to claim 1,
wherein a width of the engagement portion and the main portion of the trunk portion is larger than a width of only the main portion of the trunk portion.

14. A manufacturing method of a glass run channel assembly capable of being mounted along an inside of a groove of a door frame of a vehicle and configured to guide a window pane that moves up and down within a door when mounted to the inside of the groove, the glass run channel assembly comprising:

a first long glass run channel which is extrusion-molded, made of an elastic polymeric material and includes a terminal in a longitudinal direction thereof;

a second long glass run channel which is extrusion-molded, made of an elastic polymeric material and includes a terminal in a longitudinal direction thereof;

a connecting glass run channel which is injection-molded, made of an elastic polymeric material and connects the longitudinal terminals of the first and second long glass run channels; and an injection molded reinforcing member that is inserted into the connecting glass run channel and is made from a material harder and more rigid than the elastic polymeric material of the connecting glass run channel, wherein each of the first long glass run channel, the second long glass run channel and the connecting glass run channel includes a base bottom portion arranged at a position which faces an end face of the window pane, a side wall portion that projects integrally toward an inner perimeter side from the base bottom portion with a predetermined intersection angle with respect to the base bottom portion from at least an interior end of the base bottom portion in a width direction of the base bottom portion, and a seal lip that projects toward the base bottom portion in a folded-back shape from a protruding end side of the side wall portion, a projection portion that projects from an outer perimeter side surface of the base bottom portion and engages with an engaging portion of a window frame component member provided within a groove of the window frame component member when the connecting glass run channel is mounted in a predetermined position of the window frame component member, the projection portion includes at least a portion of the reinforcing member, the reinforcing member includes a base portion the base bottom portion and a trunk portion that projects toward an outer perimeter side from the base portion, the base bottom portion includes a base support portion, which supports the base portion of the reinforcing member, at either an inner perimeter side surface or the outer perimeter side surface of the base bottom portion, the manufacturing method comprising (a) placing the terminals of the first long glass run channel and the second long glass run channel, which are cut to respective predetermined lengths, inside a molding die at a predetermined distance from each other when a molding die capable of being opened and closed for forming the connecting glass run channel is open, (b) closing the molding die, and forming a molding cavity for molding the connecting glass run channel within the molding die, a portion of the molding cavity being defined by end faces of both terminals, (c) injecting a polymeric material into the molding cavity, and molding the connecting glass run channel so that both terminals are connected together by the connecting glass run channel, and wherein, when the connecting glass run channel is molded, the base support portion is formed on the inner perimeter side surface or the outer perimeter side surface of the base bottom portion and the projection portion includes at least one of the following (1) an insertion hole which passes through inner and outer perimeter surfaces of the base bottom portion, and (2) a protrusion portion that projects toward outer perimeter direction from the outer perimeter side surface of the base bottom portion, and (d) arranging the reinforcing member in the base bottom portion after the base bottom portion is taken out of the molding die, the reinforcing member is fixed to the base bottom portion so that the base portion is supported by the base support portion and the trunk portion is fixed to a portion of the base bottom portion, the insertion hole is formed along an axial direction in which the projection portion projects from the base bottom portion, and the insertion hole is a through hole which passes through the base bottom portion in inner and outer perimeter directions.

15. The glass run channel assembly manufacturing method according to claim 14, wherein a stepped or recessed base support portion is molded on the inner perimeter side surface or the outer perimeter side surface of the base bottom portion in the molding step (c).

16. The glass run channel assembly manufacturing method according to claim 14, wherein the reinforcing member is attached from the inner perimeter side of the base bottom portion when the reinforcing member is fixed to the base bottom portion.

17. The glass run channel assembly manufacturing method according to claim 14, wherein the reinforcing member is attached from the outer perimeter side surface of the base bottom portion when the reinforcing member is fixed to the base bottom portion.

18. The glass run channel assembly manufacturing method according to claim 14, wherein the trunk portion is inserted into the formed insertion hole, and is fixed to a portion of the base bottom portion by at least one of being fit with the insertion hole and by friction with an inner wall surface of the insertion hole.

19. The glass run channel assembly manufacturing method according to claim 14, wherein the protrusion portion is formed on the base bottom portion within the projection portion, and the trunk portion is fixed to a portion of the base bottom portion by at least one of being fit and by friction with the formed protrusion portion.

20. A glass run channel assembly capable of being mounted along an inside of a groove of a door frame of a vehicle and configured to guide a window pane that moves up and down within a door when mounted to the inside of the groove, the glass run channel assembly comprising:

a first long glass run channel which is extrusion-molded, made of an elastic polymeric material and includes a terminal in a longitudinal direction thereof;

a second long glass run channel which is extrusion-molded, made of an elastic polymeric material and includes a terminal in a longitudinal direction thereof;

a connecting glass run channel which is injection-molded, made of an elastic polymeric material and connects the longitudinal terminals of the first and second long glass run channels; and an injection molded reinforcing member that is inserted into the connecting glass run channel and is made from a material harder and more rigid than the elastic polymeric material of the connecting glass run channel, wherein each of the first long glass run channel, the second long glass run channel, and the connecting glass run channel includes a base bottom portion arranged at a position which faces an end face of the window pane, a side wall portion that projects integrally toward an inner perimeter side from the base bottom portion with a predetermined intersection angle with respect to the base bottom portion from at least an interior end of the base bottom portion in a width direction of the base bottom portion, and a seal lip that projects toward the base bottom portion in a folded-back shape from a protruding end side of the side wall portion, a projection portion that projects from an outer perimeter side surface of the base bottom portion and engages with an engaging portion of a window frame component member provided within a groove of the window frame component member when the connecting glass run channel is mounted in a predetermined position of the window frame component member, the projection portion includes at least a portion of the reinforcing member, the reinforcing member includes a base portion arranged at the base bottom portion and a trunk portion that projects toward an outer perimeter side from the base portion, the base bottom portion includes a base support portion, which supports the base portion of the reinforcing member, at either an inner perimeter side surface or the outer perimeter side surface of the base bottom portion, the projection portion includes the following (1) an insertion hole which passes through inner and outer perimeter surfaces of the base bottom portion, and (2) a protrusion portion that projects toward an outer perimeter direction from the outer perimeter side surface of the base bottom portion, the base portion is supported by the base support portion and the trunk portion is fixed to a portion of the base bottom portion when the reinforcing member is arranged at the base bottom portion, the insertion hole is formed on the base bottom portion within the projection portion, the trunk portion is inserted into the insertion hole, and is fixed to a portion of the base bottom portion by at least one of being fit with the insertion hole and by friction with an inner wall surface of the insertion hole, the trunk portion includes a main portion and an engagement portion at an outer perimeter side of the main portion, the main portion projects from the base portion in an axial direction, at least a part of the engagement portion projects further than the main portion at a side surface of the main portion in a direction intersecting with the axial direction, a bottom plane of the engagement portion extends from the side surface of the main portion to an edge of the part of the engagement portion forming an overhang, the overhang of the engagement portion engages with only a portion of a peripheral edge of the insertion hole, the insertion hole is formed along an axial direction in which the projection portion projects from the base bottom portion, the insertion hole is a through hole which passes through the base bottom portion in inner and outer perimeter directions, the protrusion portion is formed within the projection portion, and the trunk portion is fixed to a portion of the base bottom portion by being fit in the protrusion portion.

* * * * *